(12) United States Patent
Elliot

(10) Patent No.: US 11,767,228 B2
(45) Date of Patent: Sep. 26, 2023

(54) PROCESSING RARE EARTH SULPHATE SOLUTIONS

(71) Applicant: Arafura Resources Limited, Perth (AU)

(72) Inventor: Alexander Dean Elliot, Ferndale (AU)

(73) Assignee: ARAFURA RESOURCES LIMITED, Perth (AU)

( * ) Notice: Subject to any disclaimer, the term of this patent is extended or adjusted under 35 U.S.C. 154(b) by 583 days.

(21) Appl. No.: 17/046,893

(22) PCT Filed: May 2, 2019

(86) PCT No.: PCT/AU2019/050403
§ 371 (c)(1),
(2) Date: Oct. 12, 2020

(87) PCT Pub. No.: WO2019/210367
PCT Pub. Date: Nov. 7, 2019

(65) Prior Publication Data
US 2021/0140009 A1    May 13, 2021

(30) Foreign Application Priority Data
May 3, 2018  (AU) ................. 2018901510

(51) Int. Cl.
| C22B 3/10 | (2006.01) |
| C22B 59/00 | (2006.01) |
| C22B 3/20 | (2006.01) |
| C01F 17/282 | (2020.01) |
| C01F 17/235 | (2020.01) |

(52) U.S. Cl.
CPC .......... *C01F 17/282* (2020.01); *C01F 17/235* (2020.01); *C22B 3/10* (2013.01); *C22B 3/20* (2013.01); *C22B 59/00* (2013.01)

(58) Field of Classification Search
CPC ........ C01F 17/282; C01F 17/235; C22B 3/10; C22B 3/20; C22B 59/00
See application file for complete search history.

(56) References Cited

U.S. PATENT DOCUMENTS

| 2,202,526 A | 5/1940 | Hixson et al. |
| 3,975,178 A | 8/1976 | McCullough et al. |
| 4,180,545 A | 12/1979 | McCullough et al. |
| 4,497,785 A | 2/1985 | Tilley et al. |
| 4,500,502 A | 2/1985 | McDonald et al. |
| 4,514,365 A | 4/1985 | Weterings et al. |
| 5,215,575 A | 6/1993 | Butler |
| 2018/0195146 A1 | 7/2018 | Um et al. |

FOREIGN PATENT DOCUMENTS

| AU | 2008201945 A1 | 11/2009 | |
| AU | 2014250661 A1 | 10/2015 | |
| AU | 2015319798 A1 | 4/2016 | |
| AU | 2016200606 A1 | 9/2016 | |
| AU | 2014250661 B2 * | 10/2019 | ............. C22B 59/00 |
| CN | 1043685 A | 7/1990 | |
| CN | 1269327 A * | 10/2000 | ............. C01F 17/00 |
| CN | 1269327 A | 10/2000 | |
| CN | 1635169 A | 7/2005 | |
| CN | 102220488 A | 10/2011 | |
| EP | 0522234 A1 | 1/1993 | |
| KR | 10-1766788 B1 | 8/2017 | |

OTHER PUBLICATIONS

Abreu et al. "Purification of Rare Earth Elements from Monazite Sulphuric Acid Leach Liquor and the Production of High-Purity Ceric Oxide" Minerals Engineering, vol. 23, pp. 536-540, (2010).
Broadhead et al., "Radiochemical Precipitation Studies of Rare-Earth Oxalates," U.S. Department of the Interior, Bureau of Mines, (1961).
De Vasconcellos et al., "Solubility Behavior of Rare Earths with Ammonium Carbonate and Ammonium Carbonate Plus Ammonium Hydroxide: Precipitation of their Peroxicarbonates," Journal of Alloys and Compounds, vol. 451, pp. 426-428, (2008).
Habashi et al., "The Hydrochloric Acid Route for Phosphate Rock," Journal of Chemical Technology & Biotechnology, vol. 38, pp. 115-126, (1987).
Habashi, "The Recovery of Uranium and the Lathanides from Phosphate Rock", Department of Mining & Metallurgy, (1996).
Jha et al., "Review on Hydrometallurgical Recovery of Rare Earth Metals", Hydrometallurgy, vol. 161, pp. 77-101, (2016).
Krishnamurthy et al., Extractive Metallurgy of Rare Earths, CRC Press/Taylor & Francis Group, 2005.
Morais et al., "Recovery of Cerium by Oxidation/Hydrolysis with $KMnO_4$—$Na_2CO_3$", Hydrometallurgy, pp. 1773-1782(2003).
Peelman et al., "Leaching of Rare Earth Elements: Past and Present," Delft University of Technology, pp. 446-456, (2014).
Xie et al., "A Critical Review on Solvent Extraction of Rare Earths from Aqueous Solutions," Minerals Engineering, vol. 56, pp. 10-28, (2014).
Zhang, et al. "Improved Precipitation of Gibbsite from Sodium Aluminate Solution by Adding Methanol", Hydrometallurgy, vol. 98, pp. 38-44, (2009).
International Preliminary Report on Patentability and Written Opinion received in PCT Application No. PCT/AU2019/050403 (1144161) dated Nov. 22, 2019 in 12 pages.
International Search Report received in PCT Application No. PCT/AU2019/050403 dated Nov. 27, 2019.
(Continued)

*Primary Examiner* — Yong L Chu
(74) *Attorney, Agent, or Firm* — Knobbe, Martens, Olson & Bear, LLP

(57) ABSTRACT

A method of processing a purified rare earth sulphate solution, the method including the steps of: contacting the purified rare earth sulphate solution with sodium hydroxide to precipitate rare earths as rare earth hydroxide, including the addition of an oxidant to oxidise cerium contained in the rare earth hydroxide precipitate; and selectively leaching the rare earth hydroxide precipitate with hydrochloric acid to form a rare earth chloride solution and a residue.

10 Claims, 2 Drawing Sheets

(56) References Cited

OTHER PUBLICATIONS

Figure 1:
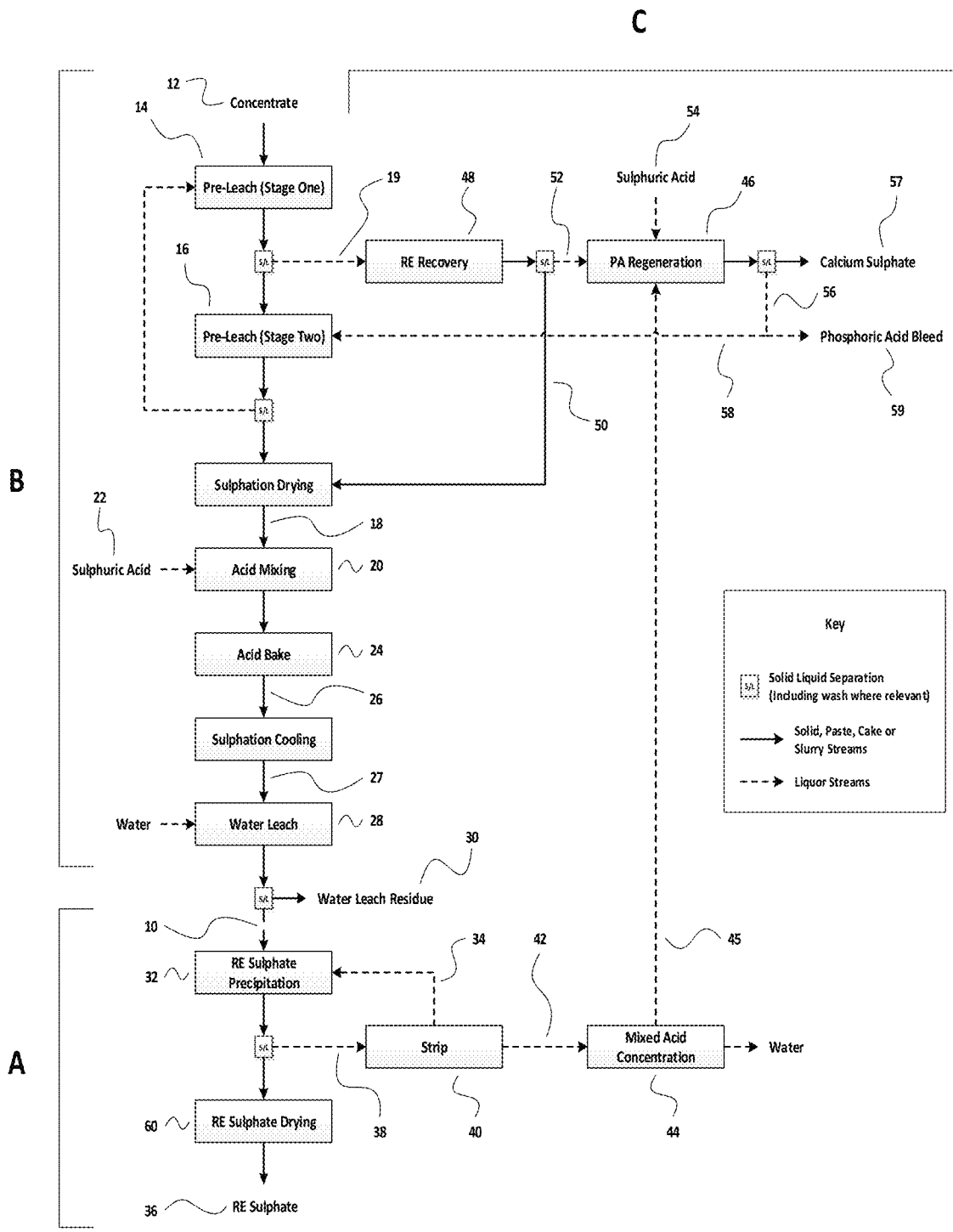

Office Action received in Chinese Patent Application No. 201980030110.3, dated Mar. 9, 2022.
Office Action received in Chinese Patent Application No. 201980030110.3, dated Oct. 18, 2022.
Office Action received in Chinese Patent Application No. 201980030110.3, dated Mar. 30, 2023.
Office Action received in Brazilian Patent Application No. BR112020021369-1, dated Jan. 11, 2023.
Office Action received in Japanese Patent Application No. 2021-510495, dated Jan. 17, 2023.
Office Action issued in corresponding Chinese Patent Application No. 201980030110.3, dated Mar. 9, 2022.
Office Action issued in corresponding Indian Patent Application No. 202037043863, dated Mar. 30, 2022.

* cited by examiner

PROCESSING RARE EARTH SULPHATE SOLUTIONS

This application is the U.S. National Phase under 35 U.S.C. § 371 of International Application PCT/AU2019/050403, filed May 2, 2019, designating the U.S., and published in English as WO 2019/210367 on Nov. 7, 2019 which claims priority to Australian Patent Application No. 2018901510, filed May 3, 2018, the entire content of which is incorporated herein by reference.

TECHNICAL FIELD

The present invention relates generally to the recovery of rare earth elements from rare earth ores or concentrates containing those elements. More particularly, the invention relates to the recovery of separate cerium and cerium free rare earth products from a rare earth sulphate solution, such as a purified rare earth sulphate solution.

A purified rare earth sulphate solution may for example be one formed from a crude rare earth sulphate derived from the sulphation (acid bake) and subsequent water leach of a monazite ore, concentrate, or associated pre-leach residue, the purified solution may for example be derived from such a crude solution by way of the formation of a rare earth sulphate precipitate followed by a water leach of the precipitate.

BACKGROUND OF THE INVENTION

Rare earth elements include all the lanthanide elements (lanthanum, cerium, praseodymium, neodymium, promethium, samarium, europium, gadolinium, terbium, dysprosium, holmium, erbium, thulium, ytterbium, and lutetium), as well as the rare metals scandium and yttrium. For ease of discussion and because of their abundance and similar properties, the Total Rare Earth Elements (TREE) are often divided into three groups; the Light Rare Earths (LRE) which are lanthanum, cerium, praseodymium, and neodymium; the Middle Rare Earths (MRE) which are samarium, europium and gadolinium (promethium does not exist as a stable element); and the Heavy Rare Earths (HRE) which are terbium, dysprosium, holmium, erbium, thulium, ytterbium, and lutetium. Yttrium and Scandium are often added to this list although they are not strictly heavy rare earth elements.

During the past twenty years there has been an explosion in demand for many items that require rare earth elements, which now include many items that people use every day, such as computer memory, DVD's, rechargeable batteries, mobile phones, catalytic converters, small electric motors, magnets, and fluorescent lighting.

Rare earth elements also play an essential role in electricity generation from wind power, new generation electric vehicles, and military applications. In this respect, the military uses include night-vision goggles, precision-guided weapons, communications equipment, GPS equipment and batteries.

The increase in use of rare earth elements in new technology devices has lead to an increase in demand, and a need for diversification in a supply chain that has been dominated by China since the early 1990s. Indeed, the development of non-Chinese resources for the mining and processing of rare earths has expanded in recent years, particularly since China announced in 2010 that it will severely restrict its export of rare earth elements to ensure supply for domestic manufacturing.

Rare earth containing minerals occurring in nature that are sufficiently rich in rare earth elements to be of current or potential future commercial interest include fluoro-carbonates (such as bastnäsite), fluorides, oxides, phosphates (such as monazite, xenotime, and apatite), and silicates (such as ionic clays and allanite). The world's resources are contained primarily in bastnäsite and monazite. Bastnäsite deposits in China and the United States constitute the largest percentage of the world's known rare-earth economic resources, while monazite deposits in Australia, Brazil, China, India, Malaysia, South Africa, Sri Lanka, Thailand, and the United States constitute the second largest segment.

Conventional methods for the extraction of rare earth elements from their ores or concentrates are described in the book ""*Extractive Metallurgy of Rare Earths*" by C. K. Gupta and N. Krishnamurthy, CRC Press, 2005.

As outlined in Gupta and Krishnamurthy (2005), rare earth elements have typically been extracted from monazite ores and concentrates by processes of sulphation. In sulphation (also called "acid baking"), the ore or concentrate is mixed with concentrated sulphuric acid and baked at elevated temperatures (such as from 200 to 500° C.) to break down the mineral matrix and convert the rare earth elements into sulphate salts that can then be brought into solution by dissolution in a water leach of the baked solids. Once the rare earth elements are in solution, being impure rare earth sulphate solutions that will herein be referred to as "crude rare earth sulphate solutions", the rare earth elements are typically recovered by a number of different prior art techniques.

Gupta and Krishnamurthy (2005) also describe processes for the extraction of rare earth elements from bastnäsite ores and concentrates (bastnäsite being a rare earth fluorocarbonate). In China, bastnäsite concentrates are processed by heating with concentrated sulphuric acid to 500° C. in a rotary kiln. The residue is then treated with water to dissolve the soluble rare earth sulphates, again forming a crude rare earth sulphate solution.

One prior art process strategy that has been adopted to recover the rare earth elements contained in such crude rare earth sulphate solutions is to neutralise acid and precipitate problematic impurities, thereby forming "purified" rare earth sulphate solutions, followed by the recovery of the rare earth elements using one of several alternative processes such as solvent extraction, rare earth carbonate precipitation, rare earth oxalate precipitation, rare earth hydroxide precipitation, or ion exchange. Another strategy is to directly recover rare earth elements from crude rare earth sulphate solutions, for which one process option is available in the prior art, namely double sulphate precipitation.

Many of these process strategies can produce a rare earth hydroxide either directly, as in hydroxide precipitation, or indirectly via caustic conversion of intermediates, such as of double sulphate, carbonate or oxalate. The cerium contained in the resultant rare earth hydroxides can be oxidised with a strong oxidising agent, or by drying in the presence of oxygen at 120 to 150° C. The mixed rare earth hydroxides may then be selectively leached in hydrochloric acid to pH 3 to 4 to produce a rare earth chloride solution and a residue. The problem with existing processes, as described by Morals et al in "*Recovery of Cerium by Oxidation/Hydrolysis With $KMNO_4$-$NA_2CO_3$*", Hydrometallurgy 2003—Fifth International Conference—Volume 2: Electrometallurgy and Environmental Hydrometallurgy, is that the selective dissolution is very slow and that about 1% of the cerium is leached into the rare earth chloride solution.

It is an aim of the present invention to provide a effective and efficient process for the selective recovery of rare earth elements from purified rare earth sulphate solutions, and thus ultimately a more economic overall process for producing separated rare earth products from rare earth containing ore.

The above discussion of background is included to explain the context of the present invention. It is not to be taken as an admission that any of the material referred to was published, known, or part of the common general knowledge (in any country) at the priority date of any one of the claims.

SUMMARY OF THE INVENTION

As mentioned above, in general terms in rare earth processing, sulphation is where an ore or concentrate is mixed with concentrated sulphuric acid and baked at elevated temperatures to break down the mineral matrix and convert the rare earth elements into sulphate salts that can then be brought into solution by dissolution in a water leach of the baked solids. Once the rare earth elements are in solution, being the so-called "crude" rare earth sulphate solutions, the rare earth elements then require recovery.

For example, in the applicant's co-pending International patent application lodged on the same day as this application, there is described a method for the precipitation of rare earth sulphate, which includes subjecting a crude rare earth sulphate solution to precipitation in the presence of a water soluble, volatile, organic compound to produce a rare earth sulphate precipitate and an acidic supernatant. The rare earth sulphate precipitate is then washed and dried, and subsequently leached in water to dissolve soluble rare earth sulphate and form a leach solution rich in rare earth sulphate and a leach residue containing impurities in the form of insoluble phosphates. The rare earth sulphate leach solution is then subjected to the precipitation of impurities to form a "purified rare earth sulphate solution" and a purification residue. It is such a "purified" rare earth sulphate solution that the present invention applies to. The present invention could equally be applied to a purified rare earth sulphate prepared by the neutralisation of crude rare earth sulphate such as described in the background.

The present invention thus provides a method of processing a purified rare earth sulphate solution, the method including the steps of:
a) contacting the purified rare earth sulphate solution with sodium hydroxide to precipitate rare earths as rare earth hydroxide, including the addition of an oxidant to oxidise cerium contained in the rare earth hydroxide precipitate; and
b) selectively leaching the rare earth hydroxide precipitate with hydrochloric acid to form a rare earth chloride solution and a residue.

In one form, in the preparation of a purified rare earth sulphate solution, the washing of a rare earth sulphate precipitate formed from a crude rare earth sulphate solution is conducted with a water-soluble, volatile, organic compound, such as methanol, with the sulphate precipitate then being dried (ideally with volatilised organic recovered and reused) prior to a water leach of the sulphate precipitate. Such a water leach preferably occurs at about 40° C. for up to 180 minutes to dissolve the soluble rare earth sulphate, while leaving most impurities behind as insoluble phosphates (such as thorium) which may be recycled or disposed. Trace quantities of soluble impurities will also be dissolved in such a process.

Then, following solid-liquid separation, the leach residue may be disposed while the resultant leach solution rich in rare earth sulphate ideally subsequently undergoes a rare earth sulphate purification stage to form the purified rare earth sulphate solution relevant to the present invention and a purification residue.

In relation to this purification stage, magnesia is preferably added to the rare earth sulphate leach solution to purify that solution by precipitation of impurities, leaving the desired purified rare earth sulphate solution and a purification residue. The purification is ideally operated to maximise the precipitation of impurities while minimising the co-precipitation of rare earth elements. As such, magnesia is preferably dosed over multiple tanks at a temperature up to about 55° C., with a 30 to 120 minute residence time in each tank, to a pH 4.5 to 6.0 end point target. Then, following solid liquid separation, the purification precipitate may be recycled or disposed, and the purified rare earth sulphate solution recovered for further processing.

Returning to a description of the processing method of the present invention, sodium hydroxide is added to the purified rare earth sulphate solution in order to precipitate the rare earths as rare earth hydroxide, with the addition of the oxidant assisting to oxidise cerium contained in the precipitate. The precipitation step a) is thus ideally operated to maximise the precipitation of rare earth elements and maximise the conversion of cerium (III) to cerium (IV), while minimising the stoichiometric excess of reagent dosing, and minimise the concentration of sulphate in the rare earth hydroxide precipitate.

The precipitation step a) preferably occurs in a two-stage counter-current process, including a precipitation stage and refining stage, wherein the rare earth sulphate solution feeds into the precipitation stage with spent solution from the refining stage, to precipitate rare earth hydroxide containing sulphate. The sulphate containing rare earth hydroxide may then be converted to clean rare earth hydroxide in the refining stage with the addition of fresh sodium hydroxide.

In a preferred form, both the precipitation and the refining stage operate at a temperature of 40 to 80° C., and for a time of about 30 to 60 minutes, with the stoichiometry of sodium hydroxide addition being in the range of 100 to 110%, and with 100 to 130% of stoichiometry dosing of oxidant.

Preferably, the oxidant is hydrogen peroxide and/or sodium hypochlorite, which is added to the precipitation and/or refining stages following sodium hydroxide addition. For the case where hydrogen peroxide is the oxidant, it is preferred that the operating temperature be in the range 50 to 60° C. at the point(s) of addition.

In the leaching step b), the selective leaching of rare earth hydroxide precipitate is preferably conducted in two stages, each stage having multiple tanks and each stage using hydrochloric acid diluted to around 10% w/w using leach solution from the first leach stage. Leach solution from the second leach stage is preferably used to re-pulp, leach rare earth hydroxide precipitate, and to precipitate cerium (IV) that has been dissolved in the second stage, prior to the first leach stage.

The selective leaching ideally occurs at a temperature of 60 to 80° C., with the first leach stage being operated to maximise rare earth dissolution while minimising cerium (IV) dissolution, which is achieved with an endpoint pH of about pH 3 to 4, and the second leach stage being operated to minimise the concentration of non-cerium rare earth elements in the residue. In this respect, it is preferred for the rare earth chloride solution to contain negligible cerium, and for the residue to consist primarily of cerium (IV) hydroxide.

The cerium (IV) hydroxide residue may be packaged as a crude cerium product or further processed to produce a higher purity cerium product. Additionally, barium chloride may subsequently be added to the rare earth chloride solution, with sulphuric acid when sulphate levels are low, to remove radium via co-precipitation with barium sulphate to form a purified rare earth chloride solution. The purified rare earth chloride solution may then be concentrated by evaporation.

Dilute and/or concentrated purified rare earth chloride may then be separated into two or more different rare earth products by solvent extraction with each rare earth product containing one or more individual rare earth elements.

The method of the invention may also include some additional steps related to the production of a suitable crude rare earth sulphate solution from a rare earth rich calcium phosphate concentrate, most likely where the rare earth rich calcium phosphate concentrate is a product of the beneficiation of a rare earth containing calcium phosphate rich ore by whole-of-ore flotation. In a preferred form, the ore contains apatite-hosted monazite, and the concentrate contains a higher grade of apatite-hosted monazite relative to the ore.

In general terms, these pre-processing steps preferably include the pre-leach of a rare earth rich calcium phosphate concentrate with phosphoric acid to form a pre-leach residue enriched in rare earths, the mixing of the pre-leach residue with sulphuric acid with subsequent heating of the mixture to convert the rare earths in the pre-leach residue to water-soluble rare earth sulphates, and finally a water leach of the heated mixture to place the rare earth sulphates in solution and thereby form the crude rare earth sulphate solution suitable for the precipitation step described above.

The crude rare earth sulphate solution may then be subjected to precipitation in the presence of a water soluble, volatile, organic compound to produce a rare earth sulphate precipitate and an acidic supernatant.

Ideally, the rare earth sulphate precipitation step is operated to maximise the extent of rare earth precipitation from solution while minimising rare earth precipitation in the form of phosphates and fluorides, and minimising the co-precipitation of impurities. The rare earth sulphate precipitate is expected to contain >35% TREE, >12% S, <2% P, <0.3% Al, and <0.5% Fe, while all organic added to the precipitation, less that volatilised, will be contained in the acid supernatant. Indeed, virtually all the water, sulphuric acid, phosphoric acid, Mg, Al, Fe, and U contained in the crude rare earth sulphate solution should be contained in the acidic supernatant.

While the rare earth sulphate precipitate subsequently undergoes further process steps to form the purified rare earth sulphate solution of the present invention, the acidic supernatant produced may also undergo further process steps aimed at the recovery of the organic compound and the regeneration of phosphoric acid. This may include recovering the organic compound from the acidic supernatant by distillation, resulting in the formation of recovered organic compound and a dilute mixed acid solution, with the recovered organic compound preferably being recycled for use in the precipitation step, and the dilute mixed acid solution being passed on directly and/or following additional concentration by evaporation for use in a phosphoric acid regeneration stage that will also be further described below.

Following the phosphoric acid pre-leach of the pre-processing stages described above, heat may be applied to the phosphoric acid pre-leach solution, to precipitate out of solution any minor amounts of rare earths as rare earth phosphates, leaving a recovery solution. It is these rare earth phosphates that may then be returned to the sulphation and acid bake steps described above.

The recovery solution may then be dosed with sulphuric acid and/or the dilute and/or concentrated mixed acid solution of the methanol-stripping stage to convert mono calcium phosphate to phosphoric acid and form a calcium sulphate precipitate which may be disposed. The target is a balance between maximising the reactivity of phosphoric acid and minimising the amount of calcium sulphate precipitate forming in the pre-leach mentioned above.

The phosphoric acid formed from the recovery solution may then be used as required by the pre-leach in the pre-processing steps described above, and the surplus phosphoric acid may be bled out of the system and forwarded on for phosphoric acid purification.

In such phosphoric acid purification, impurities (primarily uranium and thorium) in the dilute phosphoric acid bleed may be removed by ion exchange, solvent extraction or any other commercial process along with some rare earth elements. In addition, the concentration of calcium and sulphur in the dilute acid may be adjusted through the addition of sulphuric acid as required to meet consumer specifications. The purified and dilute phosphoric acid may then be concentrated up to generate a phosphoric acid by-product, which may be stored prior to shipment to customers.

DESCRIPTION OF PREFERRED EMBODIMENT

Figure 2:
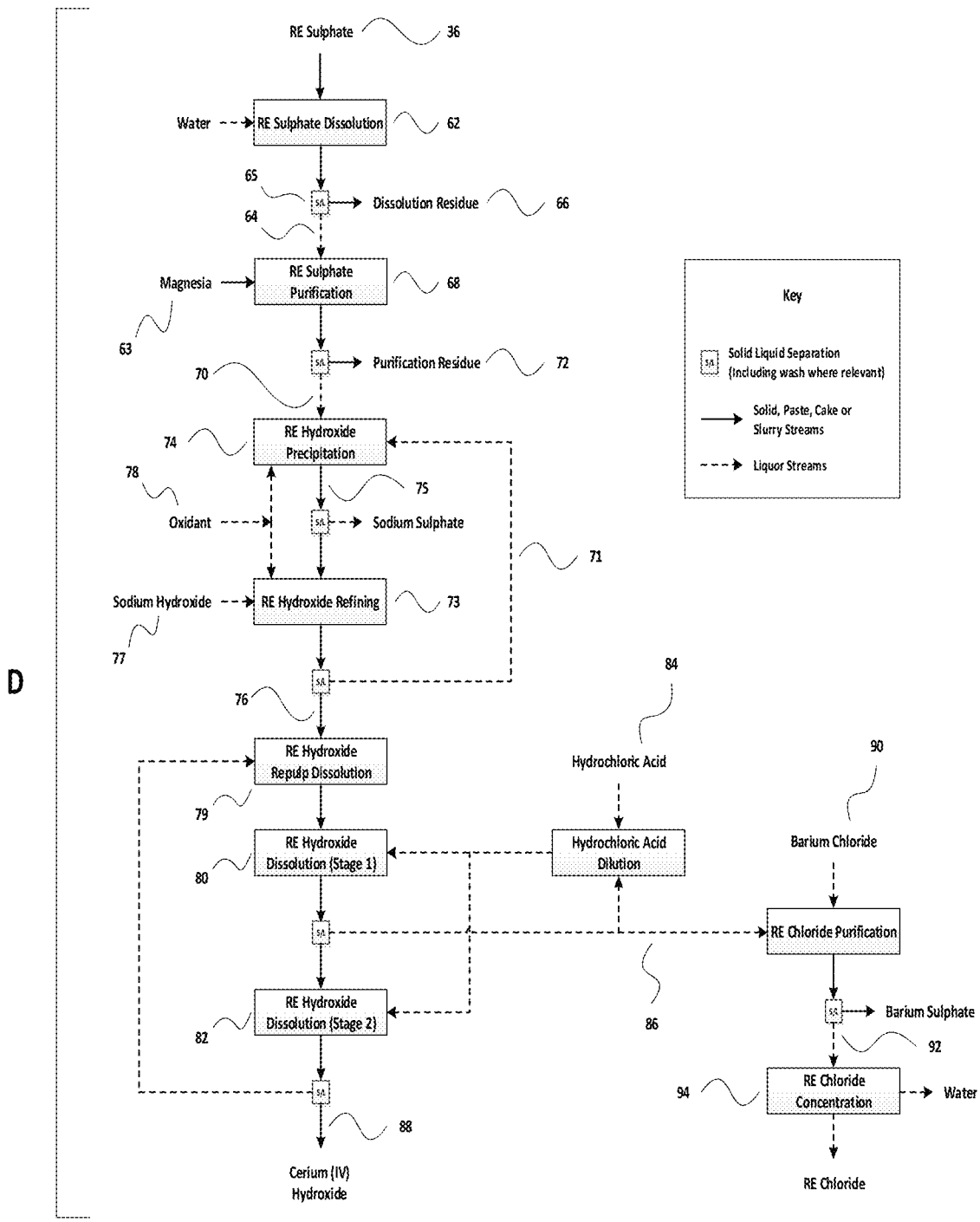

FIG. 1 is a schematic representation of a flow diagram for the precipitation of rare earth sulphates, which also illustrates a preferred pre-processing stage for the rare earth rich calcium phosphates, and a preferred associated phosphoric acid regeneration stage; and FIG. 2 is a schematic representation of a flow diagram for a preferred embodiment of a method of processing a purified rare earth sulphate solution in accordance with the present invention.

DETAILED DESCRIPTION OF THE FLOW DIAGRAM

Before providing a more detailed description of a preferred embodiment of the present invention with reference to experimental data, it will be useful to provide some explanation of the flow diagram of FIGS. 1 and 2.

FIG. 1 shows the precipitation of rare earth sulphates (section A), together with the pre-processing of rare earth rich calcium phosphates (section B) and an associated phosphoric acid regeneration stage (section C). In FIG. 2, there is shown a series of rare earth processing stages (section D). It will be appreciated that the focus of the present invention is on the rare earth processing stages in section D.

Referring firstly to FIG. 1, and in process flow order starting with section B, various steps can be seen relating to the production of a suitable crude rare earth sulphate solution 10 from a rare earth rich calcium phosphate concentrate 12, being a product of the beneficiation of a rare earth containing calcium phosphate rich ore by whole-of-ore flotation (not shown).

These pre-processing steps include the pre-leach of the concentrate with phosphoric acid in a multi stage counter current configuration 14,16 to remove calcium phosphate and to form a pre-leach residue 18 enriched in rare earths and a pre-leach solution 19 containing monocalcium phosphate, impurities and minor amounts of rare earths. In this embodiment, the leach 14,16 is operated at a low temperature (typically 30 to 45° C.), with residence times kept to between 30 to 90 minutes for each stage, and with the overall feed acid to feed concentrate mass ratio kept between 2 and 12 grams of P in the acid per gram of Ca in the concentrate.

The pre-leach residue 18 is then combined and cracked using concentrated sulphuric acid in a sulphation stage, being mixed 20 with sulphuric acid 22 either at or below an acid bake temperature for a time of up to about 30 minutes to ensure that the resulting mixture is fully homogenised prior to the next steps. Subsequent heating 24 of the mixture converts the rare earths in the pre-leach residue 18 to water-soluble rare earth sulphates 26.

The water-soluble rare earth sulphates 26 are then cooled to a temperature less than about 50° C. over a time period of up to about 300 minutes to remove as much heat out of the sulphated material 26 discharging the acid bake 24 as is practical prior to its use in a subsequent water leach 28.

The cooled water-soluble rare earth sulphates 27 are then subjected to a water leach 28 to place in solution the rare earth sulphate, phosphoric acid and any remaining sulphuric acid, and thus to form the "crude" rare earth sulphate solution 10 mentioned above and a water leach residue 30 containing insoluble gangue material for disposal.

Turning now to the next section, section A, being the precipitation of rare earth sulphates, FIG. 1 shows the sulphate precipitation stage 32 where the crude rare earth sulphate solution 10 is subjected to precipitation in the presence of a water soluble, volatile, organic compound (such as methanol) 34 to produce a rare earth sulphate precipitate 36 and an acidic supernatant 38. The sulphate precipitation 32 ideally occurs at a temperature in the range of 60 to 65° C. with a residence time in the range of 20 to 40 minutes.

While the rare earth sulphate precipitate 36 subsequently undergoes further process steps in accordance with the present invention, which will be described below in relation to FIG. 2, the acidic supernatant 38 produced in the sulphate precipitation step 32 also undergoes further process steps (section C) aimed at the recovery of the organic compound and the regeneration of phosphoric acid.

Section C of FIG. 1 thus shows recovering the organic compound from the acidic supernatant 38 by distillation 40, resulting in the formation of recovered organic compound 34 and a dilute mixed acid solution 42, with the recovered organic compound 34 being recycled for use in the sulphate precipitation step 32 as the methanol 34, and the dilute mixed acid solution 42 being subjected to additional concentration 44 by evaporation to form a concentrated mixed acid solution 45 for use in a phosphoric acid regeneration stage 46.

Following the phosphoric acid pre-leach 14,16 mentioned above, heat is applied 48 to the phosphoric acid pre-leach solution 19 to precipitate out of solution any minor amounts of rare earths as rare earth phosphates 50, leaving a recovery solution 52. As can be seen, the rare earth phosphates 50 are then returned to the acid mix 20 and acid bake 24 steps described above. The heating 48 of the phosphoric acid pre-leach solution 19 occurs in several stages of increasing temperatures, the temperatures all being in the range of 60° C. to 110° C., with stage residence times of between 60 and 180 minutes.

The recovery solution 52 is then dosed with sulphuric acid 54 in the acid regeneration stage 46 and, in this embodiment, also with the concentrated mixed acid solution 45, to convert mono calcium phosphate to recoverable phosphoric acid 56 and form a calcium sulphate precipitate 57 which may be disposed. This acid addition 46 is conducted in stages at a temperature of about 40° C. and a residence time of between 30 and 60 minutes per stage. Part of the phosphoric acid formed from the recovery solution 58 is also used by the pre-leach 14,16, while surplus phosphoric acid 59 is bled out of the system.

Turning now to FIG. 2, and the final, inventive, section (section D) of the flow diagram, which shows the rare earth processing stages, this subsequent processing includes washing and drying the rare earth sulphate precipitate (actually shown in FIG. 1 as stage 60), and subsequently leaching 62 in water the washed and dried rare earth sulphate precipitate 36 to dissolve soluble rare earth sulphate and form a leach solution 64 rich in rare earth sulphate and a leach residue 66 containing impurities in the form of insoluble phosphates.

Then, impurities are precipitated 68, with the addition of magnesia 63, from the rare earth sulphate leach solution 64 to form a "purified" rare earth sulphate solution 70 and a purification residue 72, followed by the precipitation 74 of the rare earths in the purified rare earth sulphate solution 70 as rare earth hydroxide precipitate 76.

Sodium hydroxide 77 is added to the purified rare earth sulphate solution 70 to precipitate the rare earths as rare earth hydroxide 76, with the addition of hydrogen peroxide 78 to oxidise cerium contained in the precipitate. The production of rare earth hydroxide 76 occurs in a two-stage counter current process, with purified rare earth sulphate solution 70 feeding into the precipitation stage (stage one) 74 to precipitate a crude rare earth hydroxide 75 containing some sulphate using spent solution 71 from the refining stage (stage two) 73, with the conversion of rare earth sulphate compounds to rare earth hydroxide compounds occurring with the addition of fresh sodium hydroxide 77 in rare earth hydroxide refining (stage two) 73.

The rare earth hydroxide precipitate 76 then undergoes selective leaching 79,80,82 with hydrochloric acid to form the rare earth chloride solution 86 and the residue 88 with the rare earth solution 86 containing negligible cerium, and the residue 88 consisting primarily of cerium (IV) hydroxide.

The selective leaching 79,80,82 of the rare earth hydroxide precipitate 76 is conducted in a multi stage configuration, with hydrochloric acid diluted to 10% w/w using polished stage one 80 leach solution prior to its addition to stage one 80 and stage two 82 leach tanks, over multiple tanks in each stage, and stage two 82 solution is used to re-pulp and leach rare earth hydroxide cake prior to stage one 80 leach.

The cerium (IV) hydroxide residue 88 is then packaged as a crude cerium product, while the rare earth chloride solution 86 is dosed with barium chloride 90 to remove radium via co-precipitation with barium sulphate and form a purified rare earth chloride solution 92. The purified rare earth chloride solution 92 is then concentrated by evaporation 94.

DESCRIPTION OF EXPERIMENTAL DATA

Attention will now be directed to a description of experimental data across the entire flowsheet, developed to illustrate a preferred embodiment of the present invention.

Rare Earth Sulphate Precipitation

Rare earth sulphate precipitation tests were conducted by contacting a measured quantity of pre-heated water leach solution with a measured quantity of ambient temperature methanol in a suitable well agitated baffled vessel fitted with reflux condenser to minimise evaporative loss. The resulting mixture was maintained at a setpoint temperature for a specified duration, then vacuum filtered. The filter cake was then washed thoroughly with methanol to remove entrained solution prior to drying.

The Influence of Temperature (Tests 1 and 2)

Two rare earth sulphate precipitation tests were conducted to evaluate the influence of reaction temperature on performance. One test was conducted at 60 to 65° C. (Test 1) while the other was conducted at 40 to 45° C. Both tests were conducted on the same water leach solution (Table 1) and were contacted with 1 gram of methanol per gram of water leach solution for 30 minutes. The results are summarised in Tables 2 to 4. The results indicate that operating at lower temperatures results in reduced Al, P, Fe, Th, and U co-precipitation with rare earth sulphate.

TABLE 1

Feed solution composition

| Test | LRE g/L | MRE mg/L | HRE mg/L | Y mg/L | TRE g/L | Al g/L | P g/L | S g/L | Ca mg/L | Fe g/L | Th g/L | U mg/L |
|---|---|---|---|---|---|---|---|---|---|---|---|---|
| 1 & 2 | 15.0 | 710 | 90 | 130 | 15.9 | 2.69 | 33.2 | 76.5 | 339 | 3.32 | 1.59 | 156 |

TABLE 2

Final solution composition

| Test | LRE mg/L | MRE mg/L | HRE mg/L | Y mg/L | TRE mg/L | Al g/L | P g/L | S g/L | Ca mg/L | Fe g/L | Th g/L | U mg/L |
|---|---|---|---|---|---|---|---|---|---|---|---|---|
| 1 | 427 | 92 | 28 | 64 | 610 | 1.46 | 19.2 | 39.6 | 73 | 1.80 | 660 | 77 |
| 2 | 474 | 95 | 28 | 63 | 659 | 1.39 | 18.6 | 39.6 | 56 | 1.77 | 710 | 77 |

TABLE 3

Rare earth sulphate precipitate composition (% w/w or g/t)

| Test | LRE % | MRE % | HRE g/t | Y g/t | TRE % | Al g/t | P % | S % | Ca % | Fe g/t | Th % | U g/t |
|---|---|---|---|---|---|---|---|---|---|---|---|---|
| 1 | 40.3 | 1.21 | 611 | 757 | 41.6 | 476 | 0.23 | 14.1 | 0.41 | 629 | 0.76 | 1.6 |
| 2 | 40.7 | 1.17 | 514 | 637 | 42.0 | 424 | 0.18 | 14.1 | 0.46 | 559 | 0.47 | 1.2 |

TABLE 4

Precipitation extent (%)

| Test | LRE | MRE | HRE | Y | TRE | Al | P | S | Ca | Fe | Th | U |
|---|---|---|---|---|---|---|---|---|---|---|---|---|
| 1 | 94.8 | 71.7 | 29.9 | 18.7 | 92.9 | 0.6 | 0.2 | 6.4 | 52.3 | 0.7 | 18.1 | 0.0 |
| 2 | 94.0 | 69.1 | 25.1 | 15.6 | 92.1 | 0.6 | 0.2 | 6.1 | 59.7 | 0.6 | 10.7 | 0.0 |

The Influence of Contact Ratio and Residence Time (Tests 3 to 9)

Two sets of rare earth sulphate precipitation tests were conducted to evaluate the influence of organic to aqueous contact ratio and residence time on performance. Four contact ratios (0.25, 0.5, 0.75, and 1) were tested in the first set of tests (Tests 3 to 6 respectively). Subsamples were collected at 30, 60, and 120 minutes (subsamples A, B, and C) in each of the tests 3 to 6. The second set of tests (Tests 7 to 9) evaluated shorter residence times (10, 20, and 30 minutes respectively) with a contact ratio of 1 using a different feed solution to the first set (see Table 5). All tests (Tests 3 to 9) used methanol as the organic phase, and were conducted with a 60 to 65° C. temperature target while experienced temperatures ranging between 55 to 70° C. The results are summarised in Tables 6 to 8.

The results indicate that operating at lower organic to aqueous contact ratios reduces the rare earth element precipitation extent. The results indicate that rare earth sulphate precipitation is effectively complete within the shortest residence time tested (10 minutes in Test 7), while the precipitation of impurities such as thorium are effectively complete by 20 minutes, with negligible additional precipitation observed with extended contact durations.

TABLE 5

Feed solution composition

| Test | LRE g/L | MRE mg/L | HRE mg/L | Y mg/L | TRE g/L | Al g/L | P g/L | S g/L | Ca mg/L | Fe g/L | Th g/L | U mg/L |
|---|---|---|---|---|---|---|---|---|---|---|---|---|
| 3-6 | 29.2 | 1048 | 162 | 241 | 30.7 | 3.3 | 14.4 | 53.4 | 950 | 3.0 | 2.33 | 235 |
| 7-9 | 24.6 | 890 | 115 | 205 | 25.8 | 4.0 | 14.1 | 40.4 | 1220 | 2.4 | 1.90 | 168 |

TABLE 6

Final solution composition

| Test | LRE mg/L | MRE mg/L | HRE mg/L | Y mg/L | TRE mg/L | Al g/L | P g/L | S g/L | Ca mg/L | Fe g/L | Th g/L | U mg/L |
|---|---|---|---|---|---|---|---|---|---|---|---|---|
| 3A | 274 | 89 | 39 | 86 | 488 | 1.5 | 6.01 | 19.3 | 130 | 1.3 | 0.91 | 106 |
| 3B | 291 | 90 | 40 | 87 | 508 | 1.5 | 6.04 | 19.1 | 140 | 1.4 | 0.93 | 107 |
| 3C | 264 | 90 | 40 | 91 | 485 | 1.6 | 6.18 | 18.7 | 140 | 1.5 | 0.97 | 113 |
| 4A | 674 | 106 | 43 | 96 | 919 | 1.7 | 7.08 | 23.3 | 170 | 1.6 | 1.01 | 121 |
| 4B | 782 | 107 | 45 | 98 | 1032 | 1.7 | 7.23 | 24.2 | 180 | 1.6 | 1.05 | 126 |
| 4C | 588 | 97 | 42 | 94 | 821 | 1.7 | 6.79 | 22.0 | 170 | 1.6 | 0.96 | 121 |
| 5A | 1721 | 211 | 65 | 133 | 2130 | 2.1 | 8.23 | 25.8 | 250 | 1.9 | 1.29 | 147 |
| 5B | 1839 | 222 | 67 | 141 | 2269 | 2.2 | 8.78 | 29.8 | 260 | 1.9 | 1.38 | 154 |
| 5C | 2544 | 248 | 73 | 151 | 3016 | 2.3 | 9.43 | 32.2 | 300 | 2.1 | 1.50 | 162 |
| 6A | 5721 | 457 | 100 | 176 | 6453 | 2.6 | 10.4 | 37.0 | 520 | 2.4 | 1.80 | 184 |
| 6B | 5287 | 448 | 100 | 186 | 6021 | 2.7 | 10.4 | 35.2 | 530 | 2.4 | 1.86 | 186 |
| 6C | 7265 | 498 | 106 | 193 | 8062 | 2.8 | 11.0 | 36.4 | 570 | 2.6 | 1.98 | 191 |
| 7 | 389 | 56 | 24 | 58 | 527 | 1.7 | 6.05 | 14.2 | 80 | 1.1 | 0.39 | 75 |
| 8 | 443 | 58 | 23 | 57 | 580 | 1.7 | 6.20 | 16.3 | <50 | 1.0 | 0.28 | 75 |
| 9 | 394 | 52 | 22 | 54 | 523 | 1.8 | 6.29 | 16.8 | <50 | 1.0 | 0.27 | 78 |

TABLE 7

Rare earth sulphate precipitate composition (% w/w or g/t)

| Test | LRE % | MRE % | HRE g/t | Y g/t | TRE % | Al g/t | P % | S % | Ca % | Fe g/t | Th % | U g/t |
|---|---|---|---|---|---|---|---|---|---|---|---|---|
| 3A | 40.7 | 1.19 | 695 | 1030 | 42.1 | 106 | 0.37 | 14.8 | 0.74 | 769 | 1.06 | 5.1 |
| 3B | 40.5 | 1.18 | 682 | 1000 | 41.8 | 106 | 0.37 | 14.9 | 0.77 | 769 | 1.01 | 4.7 |
| 3C | 40.6 | 1.17 | 698 | 1020 | 41.9 | 106 | 0.38 | 14.9 | 0.80 | 769 | 1.06 | 5.5 |
| 4A | 40.4 | 1.21 | 801 | 1260 | 41.9 | 212 | 0.41 | 14.9 | 0.77 | 839 | 1.16 | 7.5 |
| 4B | 39.2 | 1.16 | 755 | 1140 | 40.5 | 212 | 0.39 | 14.7 | 0.76 | 839 | 1.08 | 6.0 |
| 4C | 39.5 | 1.18 | 758 | 1140 | 40.9 | 159 | 0.41 | 14.8 | 0.80 | 839 | 1.16 | 5.4 |
| 5A | 40.3 | 1.06 | 576 | 826 | 41.5 | 106 | 0.40 | 14.9 | 0.76 | 769 | 0.94 | 6.0 |
| 5B | 39.5 | 1.09 | 567 | 801 | 40.7 | 53 | 0.39 | 14.8 | 0.73 | 769 | 0.93 | 4.5 |
| 5C | 39.8 | 1.08 | 570 | 800 | 41.0 | 53 | 0.40 | 14.8 | 0.77 | 699 | 0.94 | 5.3 |
| 6A | 41.0 | 0.90 | 369 | 473 | 42.0 | >53 | 0.35 | 14.7 | 0.49 | 490 | 0.62 | 2.0 |
| 6B | 40.3 | 0.88 | 355 | 453 | 41.2 | >53 | 0.34 | 14.7 | 0.47 | 560 | 0.60 | 2.1 |
| 6C | 40.8 | 0.87 | 355 | 461 | 41.7 | >53 | 0.38 | 14.7 | 0.55 | 525 | 0.58 | 2.5 |
| 7 | 38.9 | 1.21 | 881 | 1350 | 40.3 | 1641 | 1.21 | 14.1 | 1.52 | 2238 | 2.12 | 30 |
| 8 | 37.9 | 1.20 | 939 | 1440 | 39.3 | 2487 | 1.89 | 13.6 | 1.65 | 3567 | 2.65 | 53 |
| 9 | 38.1 | 1.26 | 997 | 1590 | 39.6 | 2540 | 1.89 | 13.7 | 1.67 | 3357 | 2.74 | 52 |

TABLE 8

Precipitation extent (%)

| Test | LRE | MRE | HRE | Y | TRE | Al | P | S | Ca | Fe | Th | U |
|---|---|---|---|---|---|---|---|---|---|---|---|---|
| 3A | 97.8 | 80.3 | 35.3 | 26.8 | 96.3 | 0.2 | 1.9 | 18.9 | 63.6 | 1.8 | 26.2 | 0.1 |
| 3B | 97.8 | 80.4 | 35.1 | 26.4 | 96.3 | 0.2 | 1.9 | 19.6 | 63.3 | 1.7 | 25.3 | 0.1 |
| 3C | 98.1 | 81.4 | 36.6 | 27.2 | 96.7 | 0.2 | 2.0 | 21.0 | 65.7 | 1.7 | 26.9 | 0.2 |
| 4A | 95.5 | 80.0 | 39.4 | 31.5 | 94.1 | 0.4 | 2.0 | 18.3 | 61.4 | 1.8 | 28.7 | 0.2 |
| 4B | 94.7 | 79.6 | 37.8 | 29.5 | 93.4 | 0.4 | 1.9 | 18.0 | 60.2 | 1.9 | 27.0 | 0.2 |
| 4C | 96.3 | 82.3 | 41.1 | 31.7 | 95.0 | 0.4 | 2.3 | 20.4 | 64.3 | 2.0 | 31.7 | 0.2 |
| 5A | 90.3 | 66.7 | 26.1 | 19.8 | 88.6 | 0.2 | 1.9 | 18.7 | 54.6 | 1.6 | 22.4 | 0.2 |
| 5B | 89.7 | 66.4 | 25.3 | 18.6 | 87.9 | 0.1 | 1.8 | 16.7 | 53.1 | 1.6 | 21.4 | 0.1 |
| 5C | 87.0 | 65.0 | 25.0 | 18.5 | 85.3 | 0.1 | 1.8 | 16.5 | 52.2 | 1.4 | 21.1 | 0.1 |
| 6A | 72.9 | 42.4 | 12.2 | 9.2 | 71.0 | — | 1.2 | 13.0 | 26.3 | 0.8 | 11.5 | 0.0 |
| 6B | 76.7 | 46.0 | 13.4 | 9.5 | 74.8 | — | 1.4 | 15.3 | 27.8 | 1.0 | 12.2 | 0.0 |
| 6C | 69.3 | 41.3 | 11.9 | 8.7 | 67.5 | — | 1.4 | 14.0 | 27.8 | 0.8 | 10.5 | 0.1 |
| 7 | 96.7 | 86.1 | 52.0 | 40.3 | 95.7 | 2.7 | 5.5 | 22.4 | 84.6 | 5.6 | 61.3 | 1.2 |
| 8 | 96.2 | 86.1 | 54.8 | 43.2 | 95.3 | 4.2 | 8.3 | 19.9 | — | 9.6 | 73.9 | 2.1 |
| 9 | 96.7 | 88.1 | 57.7 | 47.4 | 95.9 | 4.1 | 8.4 | 20.0 | — | 9.3 | 75.5 | 2.0 |

The Influence of Feed Composition (Tests 10 to 24)

Fifteen rare earth sulphate precipitation tests were conducted to evaluate the influence of variation in feed composition on precipitation performance. Each test used a different crude rare earth sulphate feed solution (Table 9), was contacted with methanol with a 1 to 1 w/w contact ratio for 30 minutes, with a 60 to 65° C. temperature target while experienced temperatures ranging between 55 to 70° C. The results are summarised in Tables 10 to 12, from which it can be seen that most tests resulted in a relatively clean rare earth sulphate precipitate with some variation in iron aluminium and phosphate co-precipitation.

To understand this impurity co-precipitation, the results have been condensed down and sequenced according to the free sulphuric acid content of crude rare earth sulphate feed solution for each test (Table 13). This free acid value is a calculated value for convenience and may not reflect the actual speciation which takes place in the feed solution. The free acid content was determined by summing up all the cations and anions measured and inferred from solution assay result with the concentration of protons calculated to balance cations and anions. It was then assumed that all phosphate is present as phosphoric acid with remaining protons assigned as sulphuric acid.

For Test 13 this resulted in a negative content of sulphuric acid which suggests that either the phosphate is not fully protonated or that assay uncertainty has biased cations over anions. Either way, Test 13 is low on free acid, and a significant fraction of the precipitating rare earth elements have precipitated as phosphates. Overall the results suggest that in order to minimise the precipitation of rare earth elements as phosphates, the from phosphate containing crude rare earth sulphate solution should contain 5% w/w or more free $H_2SO_4$ as it has been defined here.

TABLE 9

Feed solution composition

| Test | LRE g/L | MRE mg/L | HRE mg/L | Y mg/L | TRE g/L | Al g/L | P g/L | S g/L | Ca mg/L | Fe g/L | Th g/L | U mg/L |
|---|---|---|---|---|---|---|---|---|---|---|---|---|
| 10 | 13.4 | 508 | 73 | 122 | 14.1 | 0.9 | 6.25 | 24.8 | 1180 | 0.80 | 0.78 | 110 |
| 11 | 11.8 | 449 | 64 | 108 | 12.4 | 1.7 | 11.2 | 51.3 | 1043 | 1.28 | 0.69 | 97 |
| 12 | 20.7 | 625 | 79 | 155 | 21.6 | 7.6 | 31.3 | 50.4 | 810 | 4.90 | 2.24 | 193 |
| 13 | 20.8 | 684 | 85 | 163 | 21.7 | 12.1 | 40.1 | 25.4 | 3320 | 3.30 | 1.17 | 167 |
| 14 | 27.7 | 985 | 131 | 233 | 29.1 | 8.0 | 29.5 | 47.9 | 850 | 3.80 | 2.47 | 222 |
| 15 | 27.6 | 1073 | 153 | 232 | 29.0 | 5.39 | 37.9 | 112 | 420 | 4.71 | 2.35 | 228 |
| 16 | 34.1 | 1424 | 167 | 288 | 35.9 | 3.83 | 26.6 | 99.7 | 818 | 3.41 | 3.48 | 307 |
| 17 | 32.8 | 1323 | 158 | 267 | 34.5 | 3.23 | 23.8 | 91.6 | 573 | 2.37 | 3.29 | 285 |
| 18 | 34.2 | 1534 | 170 | 332 | 36.3 | 2.65 | 24.8 | 106 | 575 | 3.96 | 3.73 | 338 |
| 19 | 22.5 | 802 | 116 | 204 | 23.6 | 1.58 | 31.4 | 95.0 | 720 | 0.59 | 2.24 | 197 |
| 20 | 24.6 | 907 | 130 | 233 | 25.9 | 1.71 | 33.2 | 106 | 525 | 0.91 | 2.51 | 225 |
| 21 | 15.5 | 574 | 109 | 224 | 16.4 | 2.21 | 39.4 | 129 | 306 | 1.40 | 2.86 | 265 |
| 22 | 9.62 | 345 | 85 | 186 | 10.2 | 2.84 | 44.4 | 157 | 147 | 2.30 | 3.35 | 319 |
| 23 | 8.69 | 245 | 65 | 149 | 9.14 | 3.52 | 51.2 | 184 | 94 | 3.29 | 3.76 | 367 |
| 24 | 15.4 | 493 | 64 | 123 | 16.1 | 6.89 | 48.0 | 89.5 | 464 | 5.25 | 1.81 | 169 |

TABLE 10

Final solution composition

| Test | LRE mg/L | MRE mg/L | HRE mg/L | Y mg/L | TRE mg/L | Al g/L | P g/L | S g/L | Ca mg/L | Fe g/L | Th mg/L | U mg/L |
|---|---|---|---|---|---|---|---|---|---|---|---|---|
| 10 | 189 | 21 | 11 | 28 | 250 | 0.3 | 2.01 | 8.51 | 80 | 0.3 | 68 | 49.8 |
| 11 | 269 | 49 | 17 | 35 | 371 | 0.7 | 4.52 | 20.1 | 230 | 0.5 | 353 | 43.5 |
| 12 | 590 | 52 | 17 | 45 | 704 | 3.5 | 12.4 | 16.5 | 100 | 1.9 | 617 | 83.4 |
| 13 | 104 | 15 | 6 | 19 | 144 | 3.7 | 13.3 | 8.87 | 110 | 0.6 | 20 | 53.3 |
| 14 | 413 | 37 | 16 | 42 | 509 | 2.4 | 10.8 | 15.0 | <50 | 1.5 | 414 | 80.6 |
| 15 | 280 | 87 | 36 | 67 | 468 | 2.5 | 17.5 | 45.3 | 125 | 2.17 | 817 | 99.0 |
| 16 | 392 | 71 | 30 | 69 | 563 | 1.58 | 10.7 | 36.0 | 190 | 1.38 | 923 | 125 |
| 17 | 290 | 35 | 22 | 55 | 401 | 1.29 | 9.97 | 34.5 | 100 | 0.97 | 816 | 130 |
| 18 | 393 | 82 | 39 | 83 | 597 | 1.03 | 11.1 | 44.1 | 120 | 1.63 | 1165 | 159 |
| 19 | 354 | 59 | 24 | 56 | 494 | 0.63 | 13.8 | 39.7 | 108 | 0.25 | 629 | 81.6 |
| 20 | 320 | 68 | 27 | 62 | 478 | 0.72 | 15.0 | 45.6 | 87 | 0.39 | 692 | 86.6 |
| 21 | 366 | 68 | 28 | 65 | 526 | 0.88 | 17.4 | 5.24 | 64 | 0.56 | 896 | 102 |
| 22 | 345 | 52 | 22 | 54 | 472 | 0.93 | 18.4 | 5.06 | 28 | 0.75 | 937 | 102 |
| 23 | 477 | 49 | 20 | 50 | 596 | 1.37 | 24.6 | 7.16 | 10 | 1.26 | 1275 | 134 |
| 24 | 441 | 60 | 17 | 40 | 557 | 3.09 | 23.8 | 3.52 | 55 | 2.21 | 732 | 71.9 |

TABLE 11

Rare earth sulphate precipitate composition (% w/w or g/t)

| Test | LRE % | MRE % | HRE g/t | Y g/t | TRE % | Al % | P % | S % | Ca % | Fe % | Th % | U g/t |
|---|---|---|---|---|---|---|---|---|---|---|---|---|
| 10 | 35.8 | 1.22 | 1172 | 1890 | 37.3 | 0.11 | 1.62 | 14.2 | 2.12 | 0.21 | 2.24 | 45 |
| 11 | 38.1 | 1.08 | 670 | 932 | 39.4 | 0.005 | 0.29 | 15.3 | 1.44 | 0.05 | 0.79 | 2.6 |
| 12 | 38.8 | 1.01 | 706 | 1190 | 39.9 | 0.15 | 1.66 | 13.6 | 1.33 | 0.16 | 1.90 | 29 |
| 13 | 24.3 | 0.77 | 799 | 1410 | 25.3 | 3.38 | 11.4 | 7.21 | 3.58 | 2.20 | 3.35 | 410 |
| 14 | 36.5 | 1.24 | 964 | 1510 | 38.0 | 0.12 | 1.73 | 12.4 | 0.97 | 0.17 | 2.42 | 19 |
| 15 | 40.0 | 1.18 | 712 | 1050 | 41.4 | <0.005 | 0.22 | 14.7 | 0.32 | 0.06 | 0.61 | 1.4 |
| 16 | 40.1 | 1.23 | 910 | 1470 | 41.6 | 0.005 | 0.23 | 14.6 | 0.49 | 0.06 | 1.24 | 3.6 |

TABLE 11-continued

Rare earth sulphate precipitate composition (% w/w or g/t)

| Test | LRE % | MRE % | HRE g/t | Y g/t | TRE % | Al % | P % | S % | Ca % | Fe % | Th % | U g/t |
|---|---|---|---|---|---|---|---|---|---|---|---|---|
| 17 | 40.1 | 1.28 | 1225 | 2200 | 41.7 | 0.005 | 0.24 | 14.6 | 0.44 | 0.06 | 1.70 | 4.5 |
| 18 | 39.7 | 1.38 | 1056 | 1670 | 41.4 | <0.005 | 0.21 | 14.5 | 0.40 | 0.07 | 1.53 | 5.4 |
| 19 | 40.1 | 1.22 | 865 | 1360 | 41.6 | <0.005 | 0.28 | 14.9 | 0.73 | 0.04 | 1.17 | 2.9 |
| 20 | 41.7 | 1.29 | 926 | 1430 | 43.2 | <0.005 | 0.25 | 14.8 | 0.41 | 0.04 | 1.15 | 2.2 |
| 21 | 41.8 | 1.17 | 979 | 1550 | 43.3 | <0.005 | 0.23 | 14.7 | 0.29 | 0.04 | 1.44 | 2.4 |
| 22 | 41.2 | 0.97 | 898 | 1520 | 42.4 | <0.005 | 0.23 | 14.7 | 0.18 | 0.05 | 1.88 | 2.4 |
| 23 | 40.9 | 0.68 | 596 | 1040 | 41.7 | <0.005 | 0.25 | 15.0 | 0.30 | 0.05 | 1.66 | 7.0 |
| 24 | 39.7 | 0.88 | 498 | 787 | 40.7 | 0.02 | 0.73 | 14.7 | 0.93 | 0.06 | 0.51 | 5.5 |

TABLE 12

Precipitation extent (%)

| Test | LRE | MRE | HRE | Y | TRE | Al | P | S | Ca | Fe | Th | U |
|---|---|---|---|---|---|---|---|---|---|---|---|---|
| 10 | 96.3 | 88.8 | 60.3 | 48.2 | 95.4 | 4.9 | 10.0 | 18.8 | 78.6 | 8.8 | 82.0 | 1.2 |
| 11 | 94.6 | 73.3 | 32.4 | 24.7 | 93.0 | 0.1 | 0.8 | 8.7 | 43.7 | 1.2 | 21.7 | 0.1 |
| 12 | 93.3 | 80.5 | 46.8 | 36.1 | 92.4 | 0.9 | 2.8 | 15.0 | 73.9 | 1.8 | 39.7 | 0.7 |
| 13 | 98.8 | 94.6 | 81.3 | 72.1 | 98.4 | 23.8 | 22.7 | 21.8 | 91.8 | 55.7 | 98.3 | 20.9 |
| 14 | 95.8 | 89.5 | 60.4 | 48.0 | 95.1 | 1.3 | 4.0 | 17.7 | — | 2.9 | 60.2 | 0.6 |
| 15 | 97.5 | 78.4 | 34.8 | 29.5 | 95.9 | — | 0.3 | 8.0 | 40.7 | 0.7 | 16.5 | 0.0 |
| 16 | 96.5 | 82.3 | 44.9 | 36.4 | 95.2 | 0.1 | 0.6 | 9.8 | 41.1 | 1.1 | 26.5 | 0.1 |
| 17 | 97.6 | 91.6 | 62.2 | 54.0 | 96.8 | 0.1 | 0.7 | 11.1 | 56.6 | 1.7 | 38.0 | 0.1 |
| 18 | 96.5 | 82.3 | 43.1 | 35.7 | 95.0 | — | 0.5 | 8.4 | 48.0 | 1.2 | 26.7 | 0.1 |
| 19 | 96.1 | 81.7 | 43.7 | 34.7 | 94.8 | — | 0.4 | 7.6 | 59.5 | 3.5 | 28.8 | 0.1 |
| 20 | 96.8 | 81.2 | 43.8 | 34.5 | 95.4 | — | 0.4 | 6.9 | 51.8 | 2.4 | 27.6 | 0.1 |
| 21 | 94.0 | 70.2 | 32.1 | 24.6 | 91.8 | — | 0.2 | 3.7 | 37.9 | 0.8 | 18.0 | 0.0 |
| 22 | 89.1 | 56.1 | 21.7 | 16.2 | 86.0 | — | 0.1 | 1.9 | 30.3 | 0.4 | 12.0 | 0.0 |
| 23 | 85.6 | 49.2 | 17.0 | 12.7 | 82.9 | — | 0.1 | 1.4 | 67.6 | 0.3 | 8.3 | 0.0 |
| 24 | 92.9 | 68.3 | 30.0 | 22.5 | 91.4 | 0.1 | 0.4 | 5.7 | 71.1 | 0.4 | 9.2 | 0.1 |

TABLE 13

Rare earth sulphate composition and precipitation extents as a function of free acid

| Test | Feed Free Acid % w/w H$_2$SO$_4$ | Precipitate Composition (% w/w) | | | | Precipitation Extent (%) | | | |
|---|---|---|---|---|---|---|---|---|---|
| | | TREE | P | Al | Fe | TREE | P | Al | Fe |
| 13 | −2.5 | 25.3 | 11.4 | 3.38 | 2.20 | 98.4 | 22.7 | 23.8 | 55.7 |
| 10 | 4.3 | 37.3 | 1.62 | 0.11 | 0.21 | 95.4 | 10.0 | 4.9 | 8.8 |
| 14 | 4.5 | 38.0 | 1.73 | 0.12 | 0.17 | 95.1 | 4.0 | 1.3 | 2.9 |
| 12 | 5.7 | 39.9 | 1.66 | 0.15 | 0.16 | 92.4 | 2.8 | 0.9 | 1.8 |
| 11 | 9.9 | 39.4 | 0.29 | 0.005 | 0.05 | 93.0 | 0.8 | 0.1 | 1.2 |
| 24 | 13.7 | 40.7 | 0.73 | 0.02 | 0.06 | 91.4 | 0.4 | 0.1 | 0.4 |
| 17 | 14.8 | 41.7 | 0.24 | 0.005 | 0.06 | 96.8 | 0.7 | 0.1 | 1.7 |
| 16 | 15.9 | 41.6 | 0.23 | 0.005 | 0.06 | 95.2 | 0.6 | 0.1 | 1.1 |
| 19 | 16.1 | 41.6 | 0.28 | <0.005 | 0.04 | 94.8 | 0.4 | — | 3.5 |
| 18 | 16.9 | 41.4 | 0.21 | <0.005 | 0.07 | 95.0 | 0.5 | — | 1.2 |
| 15 | 17.7 | 41.4 | 0.22 | <0.005 | 0.06 | 95.9 | 0.3 | — | 0.7 |
| 20 | 17.7 | 43.2 | 0.25 | <0.005 | 0.04 | 95.4 | 0.4 | — | 2.4 |
| 21 | 21.3 | 43.3 | 0.23 | <0.005 | 0.04 | 91.8 | 0.2 | — | 0.8 |
| 22 | 25.2 | 42.4 | 0.23 | <0.005 | 0.05 | 86.0 | 0.1 | — | 0.4 |
| 23 | 28.1 | 41.7 | 0.25 | <0.005 | 0.05 | 82.9 | 0.1 | — | 0.3 |

Phosphoric Acid Pre-Leach

Pre-leach tests were conducted by contacting a measured quantity of temperature controlled phosphoric acid solution with a measured quantity of concentrate in a suitable well agitated baffled vessel. The resulting mixture was maintained at a setpoint temperature for a specified duration, then vacuum filtered. The filter cake was then washed thoroughly with DI water to remove entrained solution prior to drying.

The Influence of Concentrate Feed Variability

Five pre-leach tests were conducted to evaluate the influence of variability in the feed concentrate composition (Table 14) on the performance of pre-leach. Each test was conducted using the same feed acid (Table 15), with an acid to concentrate contact ratio of 8.4 grams of P in acid per gram of Ca in the concentrate, at 30° C. for two hours. The results are summarised in Table 16.

TABLE 14

Feed concentrate composition (% w/w or g/t)

| Test | LRE % | MRE % | HRE g/t | TRE % | Mg % | Al % | P % | S % | Ca % | Fe % | Th % | U g/t |
|---|---|---|---|---|---|---|---|---|---|---|---|---|
| 24 | 5.30 | 0.21 | 365 | 5.62 | 0.25 | 1.47 | 12.8 | 0.24 | 29.3 | 1.24 | 0.48 | 355 |
| 25 | 5.19 | 0.20 | 356 | 5.50 | 0.07 | 1.37 | 13.0 | 0.19 | 29.3 | 2.11 | 0.49 | 395 |

TABLE 14-continued

Feed concentrate composition (% w/w or g/t)

| Test | LRE % | MRE % | HRE g/t | TRE % | Mg % | Al % | P % | S % | Ca % | Fe % | Th % | U g/t |
|---|---|---|---|---|---|---|---|---|---|---|---|---|
| 26 | 3.71 | 0.14 | 227 | 3.92 | 0.37 | 1.01 | 11.2 | 0.13 | 31.7 | 0.67 | 0.44 | 217 |
| 27 | 5.50 | 0.21 | 387 | 5.83 | 0.04 | 4.18 | 11.7 | 0.07 | 22.4 | 0.44 | 0.57 | 415 |
| 28 | 5.87 | 0.22 | 348 | 6.19 | 0.01 | 0.08 | 16.0 | 0.24 | 34.6 | 0.25 | 0.90 | 373 |

TABLE 15

Feed acid composition (g/L or mg/L)

| Test | LRE mg/L | MRE mg/L | HRE mg/t | TRE mg/L | Mg g/L | Al g/L | P g/L | S mg/L | Ca g/L | Fe g/L | Th mg/L | U mg/L |
|---|---|---|---|---|---|---|---|---|---|---|---|---|
| 24 to 28 | 0.3 | — | — | 0.4 | 6.7 | 6.6 | 207 | <10 | 4.3 | 6.2 | 0.4 | <0.001 |

TABLE 16

Dissolution extent (%)

| Test | LRE | MRE | HRE | TRE | Mg | Al | P | S | Ca | Fe | Th | U |
|---|---|---|---|---|---|---|---|---|---|---|---|---|
| 24 | 36.6 | 42.9 | 47.2 | 37.1 | 76.5 | 9.0 | 83.2 | 22.8 | 87.1 | 11.6 | 38.0 | 31.0 |
| 25 | 34.8 | 45.4 | 52.1 | 35.5 | 44.3 | 2.8 | 83.7 | 85.8 | 84.0 | 1.6 | 32.7 | 38.4 |
| 26 | 72.4 | 74.4 | 75.1 | 72.5 | 17.0 | 9.7 | 87.5 | 87.3 | 86.8 | 11.7 | 74.1 | 76.0 |
| 27 | 18.4 | 27.1 | 34.8 | 19.1 | 46.8 | 16.6 | 63.1 | 59.3 | 72.0 | 3.8 | 46.3 | 26.1 |
| 28 | 38.5 | 43.1 | 49.9 | 38.8 | 41.4 | 17.0 | 83.1 | 89.1 | 87.5 | 0.7 | 27.7 | 34.5 |

The Influence of Feed Acid Composition

Five pre-leach tests were conducted to evaluate the influence of variability in the feed acid composition (Table 17) on the performance of pre-leach. Each test was conducted using the same feed concentrate (Table 18), with an acid to concentrate contact ratio of 13 grams of acid per gram of feed concentrate, at 30° C. for two hours. The results are summarised in Table 19.

TABLE 17

Feed acid composition (% w/w or g/t)

| Test | LRE mg/L | MRE mg/L | HRE mg/L | TRE mg/L | Mg g/L | Al g/L | P g/L | S mg/L | Ca g/L | Fe g/L | Th mg/L | U mg/L |
|---|---|---|---|---|---|---|---|---|---|---|---|---|
| 29 | 50.3 | — | — | 50.4 | 3.7 | 3.6 | 176 | <10 | 4.7 | 3.4 | <0.1 | <0.1 |
| 30 | 47.1 | — | — | 47.3 | 7.4 | 7.2 | 181 | <10 | 4.9 | 6.9 | 1.2 | <0.1 |
| 31 | 40.3 | — | — | 40.6 | 13.3 | 7.0 | 174 | <10 | 4.9 | 6.3 | <0.1 | <0.1 |
| 32 | 30.0 | — | — | 30.2 | 7.2 | 10.9 | 182 | 510 | 5.0 | 6.8 | <0.1 | <0.1 |
| 33 | 36.0 | — | — | 36.2 | 7.2 | 7.3 | 177 | <10 | 4.9 | 3.3 | <0.1 | <0.1 |

TABLE 18

Feed concentrate composition (% w/w or g/t)

| Test | LRE % | MRE % | HRE g/t | TRE % | Mg % | Al % | P % | S % | Ca % | Fe % | Th % | U g/t |
|---|---|---|---|---|---|---|---|---|---|---|---|---|
| 29 to 33 | 5.57 | 0.22 | 392 | 5.90 | 0.23 | 1.32 | 13.1 | 0.23 | 30.1 | 1.16 | 0.51 | 377 |

TABLE 19

Dissolution extent (%)

| Test | LRE | MRE | HRE | TRE | Mg | Al | P | S | Ca | Fe | Th | U |
|---|---|---|---|---|---|---|---|---|---|---|---|---|
| 29 | 31.2 | 36.7 | 46.3 | 31.7 | 80.4 | 0 | 85.2 | 90.5 | 90.1 | 6.9 | 31.2 | 25.7 |
| 30 | 30.1 | 35.3 | 41.9 | 30.5 | 81.0 | 3.3 | 74.5 | 82.9 | 79.4 | 8.4 | 31.6 | 26.2 |
| 31 | 25.2 | 27.6 | 32.9 | 25.5 | 79.5 | 0.3 | 63.0 | 72.7 | 68.1 | 6.2 | 26.9 | 19.9 |
| 32 | 29.4 | 31.9 | 37.9 | 29.7 | 80.8 | 2.0 | 69.1 | 77.2 | 74.0 | 7.8 | 32.2 | 23.5 |
| 33 | 31.6 | 32.1 | 38.4 | 31.8 | 80.9 | 1.6 | 76.3 | 84.3 | 81.2 | 7.9 | 33.5 | 25.0 |

Continuous Two Stage Counter Current Leach

A continuous two-stage pre-leach circuit test was conducted (Test 34). For this test, a thickener was used for first stage solid liquid separation, while thickening with filtration of thickener underflow was used for solid liquid separation in the second stage. The first stage featured a single tank with 30 minute residence time operated at 40 to 45° C., while the second stage contained two 30 minute residence time tanks operated at 30° C. Stage one thickener underflow fed into the first stage two leach tank along with phosphoric acid (Table 20). Stage two thickener overflow was combined with primary filtrate and spent wash solution, then fed into the stage one leach tank along with damp (9% moisture) concentrate (Table 21). Stage one thickener overflow was continuously withdrawn from the system as was washed leach residue cake from stage two. For every kilogram of concentrate (dry basis) feeding into the stage one leach tank, 10.6 kg of phosphoric acid was fed into the first stage two leach tank. The circuit performance is summarised in Table 22.

TABLE 20

Feed acid composition (g/L or mg/L)

| Test | LRE g/L | MRE mg/L | HRE mg/L | Y mg/L | TRE g/L | Al g/L | P g/L | S g/L | Ca g/L | Fe g/L | Th g/L | U g/L |
|---|---|---|---|---|---|---|---|---|---|---|---|---|
| 34 | — | — | — | — | — | 5.7 | 212 | 2 | 6.3 | 7.2 | — | — |

TABLE 21

Feed concentrate composition (% w/w or g/t)

| Test | LRE % | MRE % | HRE g/t | Y g/t | TRE % | Al % | P % | S % | Ca % | Fe % | Th % | U g/t |
|---|---|---|---|---|---|---|---|---|---|---|---|---|
| 34 | 5.6 | 0.24 | 413 | 835 | 5.9 | 1.5 | 12.4 | 0.2 | 29.6 | 1.3 | 0.46 | 422 |

TABLE 22

Pre-leach residue composition (% w/w or g/t)

| Test | LRE % | MRE % | HRE g/t | Y g/t | TRE % | Al g/t | P % | S % | Ca % | Fe g/t | Th % | U g/t |
|---|---|---|---|---|---|---|---|---|---|---|---|---|
| 34 | 11.2 | 0.42 | 663 | 1280 | 11.7 | 3.8 | 6.5 | 1.9 | 12.5 | 3.0 | 0.97 | 852 |

Rare Earth Recovery

Rare earth recovery tests were conducted by heating a measured quantity of pre-leach solution (rare earth recovery feed solution) to boiling in a suitable well agitated baffled vessel fitted with a reflux condenser. The resulting mixture was maintained under a continuous state of boiling for 120 minutes, then vacuum filtered. The filter cake was then washed thoroughly with DI water to remove entrained solution prior to drying.

Five rare earth recovery tests were conducted to evaluate the influence of variability in the feed solution composition (Table 23) on the performance of rare earth recovery. The results are summarised in Tables 24 and 25.

TABLE 23

Feed solution composition (% w/w or g/t)

| Test | LRE g/L | MRE mg/L | HRE mg/L | Y mg/L | TRE g/L | Mg g/L | Al g/L | P g/L | Ca g/L | Fe g/L | Th mg/L | U mg/L |
|---|---|---|---|---|---|---|---|---|---|---|---|---|
| 35 | 2.11 | 112 | 23 | 42 | 2.28 | 3.83 | 3.58 | 192 | 36.5 | 3.44 | 139 | 14 |
| 36 | 1.95 | 103 | 21 | 38 | 2.11 | 7.45 | 7.16 | 196 | 33.2 | 6.73 | 138 | 14 |
| 37 | 1.74 | 88 | 18 | 33 | 1.88 | 14.1 | 7.20 | 182 | 29.5 | 6.70 | 114 | 12 |

TABLE 23-continued

Feed solution composition (% w/w or g/t)

| Test | LRE g/L | MRE mg/L | HRE mg/L | Y mg/L | TRE g/L | Mg g/L | Al g/L | P g/L | Ca g/L | Fe g/L | Th mg/L | U mg/L |
|---|---|---|---|---|---|---|---|---|---|---|---|---|
| 38 | 1.84 | 95 | 20 | 36 | 1.99 | 7.40 | 10.9 | 186 | 31.5 | 6.90 | 129 | 12 |
| 39 | 1.91 | 105 | 22 | 38 | 2.07 | 7.09 | 7.00 | 182 | 32.8 | 3.30 | 141 | 14 |

TABLE 24

Precipitate composition (% w/w or g/t)

| Test | LRE % | MRE % | HRE g/t | Y g/t | TRE % | Mg g/t | Al % | P % | Ca % | Fe % | Th % | U g/t |
|---|---|---|---|---|---|---|---|---|---|---|---|---|
| 35 | 31.2 | 1.05 | 703 | 645 | 32.4 | <60 | 0.13 | 11.7 | 4.56 | 0.34 | 2.97 | 24 |
| 36 | 25.6 | 0.74 | 499 | 469 | 26.4 | <60 | 0.17 | 9.16 | 3.42 | 0.48 | 2.44 | 8.0 |
| 37 | 25.3 | 0.77 | 562 | 532 | 26.2 | <60 | 0.16 | 9.21 | 3.37 | 0.70 | 2.33 | 8.9 |
| 38 | 24.1 | 0.66 | 455 | 411 | 24.8 | <60 | 0.19 | 8.82 | 3.22 | 0.56 | 2.29 | 11 |
| 39 | 25.7 | 0.75 | 530 | 500 | 26.5 | <60 | 0.19 | 9.08 | 3.47 | 0.27 | 2.52 | 8.8 |

TABLE 25

Precipitation extent (%)

| Test | LRE | MRE | HRE | Y | TRE | Mg | Al | P | Ca | Fe | Th | U |
|---|---|---|---|---|---|---|---|---|---|---|---|---|
| 35 | 80.1 | 52.1 | 22.6 | 7.6 | 76.9 | — | 0.18 | 0.30 | 0.61 | 0.49 | 91.8 | 0.82 |
| 36 | 71.2 | 42.2 | 16.9 | 6.4 | 68.1 | — | 0.12 | 0.24 | 0.52 | 0.37 | 80.0 | 0.30 |
| 37 | 81.1 | 47.1 | 17.8 | 8.0 | 77.5 | — | 0.11 | 0.25 | 0.56 | 0.51 | 85.4 | 0.38 |
| 38 | 68.6 | 35.2 | 11.5 | 5.6 | 65.2 | — | 0.08 | 0.23 | 0.50 | 0.39 | 76.0 | 0.43 |
| 39 | 73.6 | 42.6 | 17.1 | 6.8 | 70.1 | — | 0.14 | 0.26 | 0.54 | 0.41 | 83.1 | 0.33 |

Phosphoric Acid Regeneration

A continuous phosphoric acid regeneration circuit test was conducted (Test 40). The circuit featured a single 55 minute residence time precipitation tank (Tank 1) operated at 44° C., followed by a 78 minute stabilisation tank (Tank 2) and batch vacuum filtration, which was supported by duty standby filter feed tanks and was operated with counter current washing. Recovery solution was fed into the precipitation tank along with mixed acid (Table 26). The regeneration performance is summarised in Tables 27 and 29.

TABLE 26

Feed solution composition (g/L or mg/L)

| Solution | LRE mg/L | MRE mg/L | HRE mg/L | Y mg/L | TRE mg/L | Al g/L | P g/L | S g/L | Ca g/L | Fe g/L | Th mg/L | U mg/L |
|---|---|---|---|---|---|---|---|---|---|---|---|---|
| Recovery | 570 | 94 | 40 | 116 | 704 | 4.87 | 184 | 0.82 | 27.0 | 5.42 | 26 | 53 |
| Mixed | — | — | — | — | — | 3.2 | 84 | 379 | — | 3.2 | — | — |

TABLE 27

Precipitate composition (% w/w or g/t)

| Tank | LRE g/t | MRE g/t | HRE g/t | Y g/t | TRE g/t | Al g/t | P % | S % | Ca % | Fe g/t | Th g/t | U g/t |
|---|---|---|---|---|---|---|---|---|---|---|---|---|
| 1 | 1134 | 85 | 24 | 52 | 1244 | 1852 | 1.79 | 19.2 | 25.4 | 420 | 31 | 2.2 |
| 2 | 1082 | 86 | 24 | 54 | 1192 | 1799 | 1.68 | 19.2 | 25.3 | 420 | 31 | 1.9 |

TABLE 28

Regenerated solution composition (g/L or mg/L)

| Tank | LRE mg/L | MRE mg/L | HRE mg/L | Y mg/L | TRE mg/L | Al g/L | P g/L | S g/L | Ca g/L | Fe g/L | Th mg/L | U mg/L |
|---|---|---|---|---|---|---|---|---|---|---|---|---|
| 1 | 436 | 83 | 38 | 105 | 558 | 4.75 | 19.4 | 2.22 | 3.91 | 5.88 | 26.5 | 53.1 |
| 2 | 461 | 86 | 39 | 114 | 586 | 4.63 | 19.3 | 1.66 | 3.82 | 5.91 | 27.2 | 53.8 |

TABLE 29

Overall precipitation extent (%)

| Tank | LRE | MRE | HRE | Y | TRE | Al | P | S | Ca | Fe | Th | U |
|---|---|---|---|---|---|---|---|---|---|---|---|---|
| 1 | 21.0 | 9.5 | 6.0 | 4.8 | 18.5 | 3.8 | 0.9 | 89.8 | 86.9 | 0.7 | 10.8 | 0.4 |
| 2 | 18.0 | 8.5 | 5.5 | 4.2 | 16.0 | 3.5 | 0.8 | 91.5 | 86.1 | 0.7 | 9.5 | 0.3 |

Acid Bake and Water Leach

Acid bake water leach tests were conducted by contacting a measured quantity of sulphuric acid with a measured quantity of pre-leach residue with thorough mixing in a suitable dish. The resulting mixture was placed in a furnace and raised to 250° C. over a period of up to 50 minutes, then held at 250° C. for a period of 30 minutes, withdrawn from furnace and allowed to cool. The cool sulphated material was then added to a measured quantity of 5° C. DI water, agitated for 10 minutes, then vacuum filtered. The filter cake was then washed thoroughly with DI water to remove entrained solution prior to drying.

Six acid bake water leach tests (Tests 41 to 46) were conducted to evaluate the influence of variability in the feed pre-leach residue composition (Table 30) on the performance of acid bake water leach. Each test was conducted using an acid to residue contact ratio of 1600 kg of $H_2SO_4$ per tonne of leach residue, and 2.5 g of DI per gram of pre-leach residue. The results are summarised in Tables 31 to 33.

TABLE 30

Feed pre-leach residue composition (% w/w or g/t)

| Test | LRE % | MRE % | HRE g/t | Y % | TRE % | Al % | P % | S % | Ca % | Fe % | Th % | U g/t |
|---|---|---|---|---|---|---|---|---|---|---|---|---|
| 41 | 11.2 | 0.40 | 642 | 0.13 | 11.7 | 4.45 | 7.16 | 0.64 | 12.5 | 3.64 | 0.98 | 814 |
| 42 | 10.1 | 0.33 | 510 | 0.10 | 10.6 | 3.99 | 6.33 | 0.08 | 14.0 | 6.20 | 0.99 | 729 |
| 43 | 4.15 | 0.15 | 229 | 0.05 | 4.36 | 3.69 | 5.67 | 0.07 | 17.0 | 2.40 | 0.46 | 211 |
| 44 | 8.44 | 0.29 | 475 | 0.09 | 8.86 | 6.56 | 8.07 | 0.05 | 11.8 | 0.80 | 0.58 | 577 |
| 45 | 18.5 | 0.65 | 891 | 0.19 | 19.4 | 0.36 | 13.9 | 0.13 | 22.2 | 1.28 | 3.33 | 1250 |
| 46 | 12.5 | 0.44 | 706 | 0.14 | 13.1 | 9.66 | 6.46 | 0.02 | 2.29 | 1.85 | 1.42 | 839 |

TABLE 31

Water leach solution composition (g/L or mg/L)

| Test | LRE g/L | MRE g/L | HRE mg/L | Y mg/L | TRE g/L | Al g/L | P g/L | S g/L | Ca g/L | Fe g/L | Th g/L | U mg/L |
|---|---|---|---|---|---|---|---|---|---|---|---|---|
| 41 | 34.9 | 1.24 | 170 | 308 | 36.7 | 1.79 | 22.7 | 104 | 0.58 | 3.08 | 2.79 | 280 |
| 42 | 28.0 | 0.86 | 108 | 193 | 29.2 | 1.56 | 18.7 | 108 | 0.86 | 7.35 | 2.50 | 219 |
| 43 | 10.0 | 0.32 | 34 | 65 | 10.4 | 0.53 | 16.7 | 98.6 | 1.30 | 0.20 | 1.06 | 66 |
| 44 | 25.3 | 0.81 | 97 | 183 | 26.4 | 0.87 | 23.3 | 92.9 | 1.46 | 0.16 | 1.56 | 198 |
| 45 | 52.1 | 1.71 | 207 | 372 | 52.1 | 0.95 | 38.7 | 86.0 | 0.61 | 3.48 | 4.68 | 374 |
| 46 | 42.5 | 1.49 | 220 | 382 | 42.5 | 0.58 | 17.9 | 96.4 | 1.37 | 0.27 | 4.35 | 315 |

TABLE 32

Water leach residue composition (% w/w or g/t)

| Test | LRE % | MRE g/t | HRE g/t | Y g/t | TRE % | Al % | P % | S % | Ca % | Fe % | Th g/t | U g/t |
|---|---|---|---|---|---|---|---|---|---|---|---|---|
| 41 | 0.26 | 264 | 118 | 200 | 0.32 | 3.93 | 0.54 | 13.8 | 10.6 | 2.44 | 251 | 16.5 |
| 42 | 0.29 | 193 | 83 | 153 | 0.34 | 4.07 | 0.36 | 8.89 | 12.2 | 3.63 | 141 | 21.6 |
| 43 | 0.18 | 152 | 62 | 116 | 0.21 | 3.55 | 0.23 | 9.45 | 12.4 | 2.10 | 480 | 12.4 |
| 44 | 0.10 | 139 | 62 | 109 | 0.13 | 5.56 | 0.92 | 14.3 | 5.34 | 0.66 | 267 | 8.6 |

TABLE 32-continued

| | Water leach residue composition (% w/w or g/t) | | | | | | | | | | |
|---|---|---|---|---|---|---|---|---|---|---|---|
| Test | LRE % | MRE g/t | HRE g/t | Y g/t | TRE % | Al % | P % | S % | Ca % | Fe % | Th g/t | U g/t |
| 45 | 0.68 | 897 | 261 | 433 | 0.84 | 0.35 | 0.34 | 21.3 | 25.9 | 0.26 | 4660 | 24.9 |
| 46 | 0.12 | 73 | 56 | 110 | 0.14 | 7.47 | 1.15 | 14.7 | 4.15 | 1.35 | 609 | 14.6 |

TABLE 33

| | Dissolution extent (%) | | | | | | | | | | |
|---|---|---|---|---|---|---|---|---|---|---|---|
| Test | LRE | MRE | HRE | Y | TRE | Al | P | S[1] | Ca | Fe | Th | U |
| 41 | 98.0 | 94.5 | 84.1 | 85.0 | 97.7 | 1.4 | 93.9 | 25.5 | 1.5 | 31.7 | 97.6 | 98.4 |
| 42 | 97.9 | 95.5 | 86.3 | 85.8 | 97.7 | 15.5 | 96.2 | 14.5 | 2.2 | 49.3 | 98.8 | 98.0 |
| 43 | 95.5 | 89.0 | 68.1 | 68.3 | 94.9 | 5.4 | 96.5 | 19.9 | 2.8 | 3.5 | 89.4 | 95.3 |
| 44 | 98.5 | 94.0 | 80.9 | 82.0 | 98.2 | 4.1 | 87.4 | 36.0 | 3.8 | 6.2 | 94.1 | 98.4 |
| 45 | 97.4 | 90.3 | 79.4 | 80.7 | 96.9 | 56.9 | 98.2 | 33.5 | 1.0 | 86.7 | 83.0 | 98.6 |
| 46 | 98.8 | 97.8 | 89.7 | 88.5 | 98.6 | 1.7 | 77.4 | 40.8 | 16.8 | 4.2 | 94.0 | 97.9 |

[1]deportment from sulphuric acid to water leach residue for S

Rare Earth Sulphate Dissolution

Rare earth sulphate dissolution tests are typically conducted by contacting a measured quantity of dry rare earth sulphate precipitate with a measured quantity of DI water with thorough mixing in a suitable well agitated baffled vessel, at 40° C. for a period of 120 minutes, then vacuum filtered. The filter cake was then washed thoroughly with DI water to remove entrained solution prior to drying.

Five rare earth sulphate dissolution tests (Tests 47 to 51) were conducted to evaluate the influence of variability in the feed composition (Table 34) on the performance of dissolution. Each test was conducted using a water to feed solids contact ratio of 13 grams of DI water per gram of feed solid. Test 47 was operated with a 60 minute dissolution at 22° C., while tests 48 to 51 were operated with a 120 minute dissolution at 40° C. The results are summarised in Tables 35 to 37.

TABLE 34

| | Feed rare earth sulphate composition (% w/w or g/t) | | | | | | | | | | |
|---|---|---|---|---|---|---|---|---|---|---|---|
| Test | LRE % | MRE % | HRE g/t | Y g/t | TRE % | Al g/t | P % | S % | Ca % | Fe g/t | Th % | U g/t |
| 47 | 35.2 | 1.05 | 833 | 1363 | 36.5 | 9185 | 3.88 | 12.2 | 1.97 | 6902 | 2.51 | 123 |
| 48 | 40.0 | 1.18 | 712 | 1050 | 41.4 | <53 | 0.22 | 14.7 | 0.32 | 560 | 0.61 | 1.4 |
| 49 | 43.4 | 1.28 | 999 | 1680 | 44.9 | 212 | 0.24 | 14.9 | 0.51 | 769 | 1.47 | 3.7 |
| 50 | 41.2 | 0.97 | 898 | 1520 | 42.4 | <53 | 0.23 | 14.7 | 0.17 | 490 | 1.88 | 2.4 |
| 51 | 40.3 | 1.21 | 611 | 757 | 41.6 | 476 | 0.23 | 14.1 | 0.41 | 629 | 0.76 | 1.6 |

TABLE 35

| | Dissolution solution composition (g/L or mg/L) | | | | | | | | | | |
|---|---|---|---|---|---|---|---|---|---|---|---|
| Test | LRE g/L | MRE mg/L | HRE mg/L | Y mg/L | TRE g/L | Al mg/L | P mg/L | S g/L | Ca mg/L | Fe mg/L | Th mg/L | U mg/L |
| 47 | 11.4 | 401 | 43 | 68 | 11.9 | 500 | 2950 | 6.28 | 690 | 400 | 4.8 | 3.3 |
| 48 | 34.5 | 1120 | 92 | 78 | 35.8 | 190 | 5 | 14.3 | 223 | 10 | 103 | 0.15 |
| 49 | 29.6 | 1084 | 94 | 119 | 30.9 | 20 | <3 | 12.1 | 293 | 20 | 286 | 0.38 |
| 50 | 34.6 | 843 | 91 | 122 | 35.6 | <10 | 4 | 12.8 | 239 | <10 | 345 | 0.17 |
| 51 | 27.2 | 875 | 70 | 72 | 28.2 | <10 | <3 | 10.1 | 166 | 10 | 110 | 0.19 |

TABLE 36

Dissolution residue composition (% w/w or g/t)

| Test | LRE % | MRE % | HRE g/t | Y g/t | TRE % | Al g/t | P % | S % | Ca g/t | Fe g/t | Th % | U g/t |
|---|---|---|---|---|---|---|---|---|---|---|---|---|
| 47 | 35.2 | 0.91 | 471 | 536 | 36.2 | 5716 | 8.03 | 7.53 | 19900 | 14618 | 4.97 | 145 |
| 48 | 36.9 | 0.86 | 180 | 117 | 37.8 | 1799 | 10.2 | 0.35 | <72 | 5735 | 23.3 | 3.8 |
| 49 | 22.5 | 0.53 | 168 | 142 | 23.1 | 265 | 7.77 | 8.01 | 1001 | 5106 | 39.1 | 3.7 |
| 50 | 5.01 | 0.12 | 51 | 41 | 5.13 | <53 | 8.25 | 2.82 | <71 | 5456 | 51.0 | 4.1 |
| 51 | 30.8 | 0.64 | 105 | 46 | 31.4 | 318 | 8.65 | 4.13 | 786 | 5664 | 21.8 | 3.7 |

TABLE 37

Dissolution extent (%)

| Test | LRE | MRE | HRE | Y | TRE | Al | P | S | Ca | Fe | Th | U |
|---|---|---|---|---|---|---|---|---|---|---|---|---|
| 47 | 53.5 | 59.5 | 73.7 | 81.7 | 53.8 | 71.0 | 3.5 | 71.3 | 53.0 | 1.3 | 7.6 | 45.0 |
| 48 | 97.8 | 98.2 | 99.4 | 99.7 | 97.8 | — | 2.7 | 99.9 | 82.2 | 21.2 | 6.2 | 93.2 |
| 49 | 98.7 | 99.0 | 99.6 | 99.8 | 98.7 | 96.9 | — | 98.7 | 99.5 | 32.3 | 34.1 | 97.5 |
| 50 | 99.9 | 99.9 | 99.9 | 100 | 99.9 | — | 2.0 | 99.8 | — | — | 73.1 | 98.3 |
| 51 | 98.2 | 98.8 | 99.6 | 99.9 | 98.2 | 98.4 | — | 99.3 | 99.6 | 20.9 | 32.6 | 94.5 |

Rare Earth Purification

Rare earth purification tests (Tests 52 and 53) were conducted by dosing magnesia, to a pH 5 endpoint target, to a measured quantity of impure rare earth sulphate solution at 40° C. in a suitable well agitated baffled vessel with online pH measurement. The resulting mixture was mixed for a period of 30 minutes following magnesia addition to allow it to stabilise, then vacuum filtered. The filter cake was then washed thoroughly with DI water to remove entrained solution prior to drying.

Two rare earth purification tests were conducted to evaluate the influence of variability in the source magnesia (Table 38) on the performance of rare earth purification from a common feed solution (Table 39). The results are summarised in Tables 40 to 42. In both tests (52 and 53), 0.16 kg of MgO was dosed per tonne of feed solution. There was 97.3% utilisation of magnesia in Test 52, and a 91.1% utilisation of magnesia in Test 53.

TABLE 38

Magnesia composition (% w/w or g/t)

| Test | LRE g/t | MRE g/t | HRE g/t | TRE g/t | Mg % | Al % | P g/t | S g/t | Ca % | Fe % | Th g/t | U g/t |
|---|---|---|---|---|---|---|---|---|---|---|---|---|
| 52 | 28 | 9.8 | 3.7 | 49 | 39.9 | 0.09 | 22 | 80 | 2.42 | 0.18 | <1 | 0.15 |
| 53 | 26 | 8.6 | 3.8 | 46 | 38.3 | 0.05 | <4 | 40 | 0.51 | 0.06 | 5 | 0.09 |

TABLE 39

Feed solution composition (g/L or mg/L)

| Test | LRE g/L | MRE mg/L | HRE mg/L | TRE g/L | Mg mg/L | Al mg/L | P mg/L | S g/L | Ca mg/L | Fe mg/L | Th mg/L | U mg/L |
|---|---|---|---|---|---|---|---|---|---|---|---|---|
| 52 & 53 | 20.2 | 725 | 48 | 21.1 | <2 | <10 | 14 | 7.64 | 88 | <1 | 113 | 0.76 |

TABLE 40

Precipitate composition (% w/w or g/t)

| Test | LRE % | MRE % | HRE g/t | TRE % | Mg % | Al % | P g/t | S % | Ca % | Fe % | Th % | U g/t |
|---|---|---|---|---|---|---|---|---|---|---|---|---|
| 52 | 30.1 | 2.38 | 1533 | 32.7 | 0.61 | 1.36 | 882 | 7.33 | 0.21 | 2.06 | 18.5 | 17.2 |
| 53 | 24.5 | 1.74 | 1030 | 26.4 | 2.85 | 1.83 | 1157 | 6.05 | 0.10 | 2.67 | 22.7 | 17.2 |

TABLE 41

Purified rare earth sulphate solution composition (g/L or mg/L)

| Test | LRE g/L | MRE mg/L | HRE mg/L | TRE g/L | Mg mg/L | Al mg/L | P mg/L | S g/L | Ca mg/L | Fe mg/L | Th mg/L | U mg/L |
|---|---|---|---|---|---|---|---|---|---|---|---|---|
| 52 | 20.1 | 704 | 45 | 20.9 | 79 | <10 | 11 | 8.48 | 92 | <1 | 0.56 | 0.45 |
| 53 | 19.8 | 722 | 45 | 20.7 | 65 | <10 | <3 | 8.29 | 89 | <1 | 1.74 | 0.13 |

TABLE 42

Precipitation extent (%)

| Test | LRE | MRE | HRE | TRE | Mg | Al | P | S | Ca | Fe | Th | U |
|---|---|---|---|---|---|---|---|---|---|---|---|---|
| 52 | 0.44 | 0.97 | 0.95 | 0.46 | — | — | 1.9 | 0.28 | 0.67 | — | 99.5 | 41.2 |
| 53 | 0.23 | 0.46 | 0.42 | 0.24 | — | — | 1.6 | 0.15 | 0.22 | — | 98.5 | 82.9 |

RE Hydroxide Precipitation

The Influence of Reagent

Rare earth hydroxide precipitation tests (Tests 54 to 56) were conducted by contacting a measured quantity of magnesia or sodium hydroxide to a measured quantity of purified rare earth sulphate solution at 55° C. in a suitable well agitated baffled vessel. The resulting mixture was mixed for a period of 30 minutes following each dose of reagent addition to allow it to stabilise, then subsample collected, and vacuum filtered. Subsample filter cake was then washed thoroughly with DI water to remove entrained solution prior to drying. For each test, a range of subsamples were collected to cover a range of reagent doses. Following the final precipitation subsample, a measured quantity of hydrogen peroxide was added to the remaining slurry. The resulting mixture was mixed for a period of 30 minutes to allow it to stabilise, then vacuum filtered.

Two of the rare earth hydroxide precipitation tests (Test 54 and 55) were conducted to evaluate the influence of variability in the source of magnesia (Table 43) on the performance of rare earth hydroxide precipitation, while the third test (Test 56) evaluated the use of sodium hydroxide. All three tests were based on a common feed solution (Table 44). Reagent dosing is summarised in Table 45. The results are summarised in Tables 46 and 47. From the results it can be seen that the use of magnesia results in significantly increased impurities in the resultant precipitate relative to precipitation using sodium hydroxide. In addition, increased dose rates result in reduced overall deportment of sulphate to rare earth hydroxide precipitate.

TABLE 43

Magnesia composition (% w/w or g/t)

| Test | LRE g/t | MRE g/t | HRE g/t | TRE g/t | Mg % | Al % | P g/t | S g/t | Ca % | Fe % | Th g/t | U g/t |
|---|---|---|---|---|---|---|---|---|---|---|---|---|
| 54 | 28 | 9.8 | 3.7 | 49 | 39.9 | 0.09 | 22 | 80 | 2.42 | 0.18 | <1 | 0.15 |
| 55 | 26 | 8.6 | 3.8 | 46 | 38.3 | 0.05 | <4 | 40 | 0.51 | 0.06 | 5 | 0.09 |

TABLE 44

Feed solution composition (g/L or mg/L)

| Test | LRE g/L | MRE mg/L | HRE mg/L | TRE g/L | Mg mg/L | Al mg/L | P mg/L | S g/L | Ca mg/L | Fe mg/L | Th mg/L | U mg/L |
|---|---|---|---|---|---|---|---|---|---|---|---|---|
| 54 to 56 | 20.5 | 760 | 48 | 21.4 | 72 | <10 | <3 | 7.49 | 90 | <1 | 0.73 | 0.21 |

TABLE 45

Reagent Addition [1]

| Sample | A | B | C | D | E |
|---|---|---|---|---|---|
| 54 | 8.6 | 9.1 | 9.6 | 10.2 | 125 |
| 55 | 8.6 | 9.0 | 9.6 | 10.1 | 126 |
| 56 | 16.9 | 17.9 | 19.0 | 20.1 | 126 |

[1] sodium hydroxide (Test 56) addition, where dosing is in the units kg Magnesia or NaOH per t of feed. Subsample E corresponds to a period of hydrogen peroxide dosing with reagent addition expressed as a percentage of stoichiometry.

TABLE 46

Precipitate composition (% w/w or g/t)

| Test | LRE % | MRE % | HRE g/t | TRE % | Mg % | Al g/t | P g/t | S % | Ca % | Fe g/t | Th g/t | U g/t |
|---|---|---|---|---|---|---|---|---|---|---|---|---|
| 54A | 51.9 | 1.52 | 713 | 53.6 | 2.80 | 318 | 109 | 6.57 | 0.17 | 769 | 109 | 1.25 |
| 54B | 53.9 | 1.60 | 744 | 55.7 | 2.98 | 318 | 92 | 5.73 | 0.16 | 839 | 78 | 1.48 |
| 54C | 57.0 | 1.67 | 783 | 58.9 | 2.46 | 265 | 92 | 4.25 | 0.21 | 909 | 82 | 1.33 |
| 54D | 56.6 | 1.65 | 777 | 58.4 | 2.76 | 265 | 83 | 3.45 | 0.14 | 909 | 84 | 1.34 |
| 54E | 58.6 | 1.75 | 826 | 60.5 | 2.48 | 529 | 92 | 3.04 | 0.17 | 1049 | 87 | 1.44 |
| 55A | 51.4 | 1.54 | 733 | 53.1 | 2.35 | 212 | 92 | 6.77 | 0.06 | 489 | 74 | 1.16 |
| 55B | 50.7 | 1.51 | 715 | 52.4 | 2.36 | 159 | 87 | 5.81 | 0.15 | 489 | 75 | 1.17 |
| 55C | 50.6 | 1.50 | 717 | 52.3 | 2.40 | 159 | 87 | 5.17 | 0.20 | 489 | 74 | 1.21 |
| 55D | 50.1 | 1.50 | 710 | 51.7 | 2.81 | 159 | 83 | 4.85 | 0.21 | 559 | 73 | 1.19 |
| 55E | 52.7 | 1.57 | 762 | 54.4 | 2.53 | 212 | 92 | 4.41 | 0.20 | 629 | 79 | 1.21 |
| 56A | 58.8 | 1.73 | 844 | 60.8 | 0.23 | <53 | 83 | 3.10 | 0.34 | 489 | 86 | 1.33 |
| 56B | 63.8 | 1.89 | 934 | 65.9 | 0.23 | <53 | 96 | 2.60 | 0.41 | 489 | 97 | 1.48 |
| 56C | 63.1 | 1.88 | 886 | 65.2 | 0.22 | <53 | 92 | 1.60 | 0.46 | 489 | 93 | 1.48 |
| 56D | 63.9 | 1.90 | 907 | 66.0 | 0.22 | <53 | 74 | 1.17 | 0.44 | 420 | 96 | 1.55 |
| 56E | 67.8 | 2.04 | 968 | 70.1 | 0.23 | <53 | 87 | 0.46 | 0.51 | 489 | 97 | 2.20 |

TABLE 47

Precipitation extent (%)

| Test | LRE | MRE | HRE | TRE | Mg | Al | P | S | Ca | Fe | Th | U |
|---|---|---|---|---|---|---|---|---|---|---|---|---|
| 54A | 99.4 | 99.3 | 99.2 | 99.4 | — | — | — | 38.4 | 22.5 | — | 90.3 | 97 |
| 54B | 99.9 | 99.9 | 99.8 | 99.9 | — | — | — | 33.0 | 20.7 | — | 90.3 | >97 |
| 54C | 100 | 99.9 | 100 | 100 | — | — | — | 23.3 | 22.3 | — | 92.2 | >97 |
| 54D | 99.9 | 99.9 | 99.9 | 99.9 | — | — | — | 17.9 | 15.2 | — | 93.8 | >97 |
| 54E | 99.9 | 99.9 | 100 | 99.9 | — | — | — | 14.6 | 17.4 | — | 94.1 | >97 |
| 55A | 99.5 | 100 | 100 | 99.5 | — | — | — | 36.5 | 15.4 | — | 93.5 | >97 |
| 55B | 99.9 | 99.9 | 99.9 | 99.9 | — | — | — | 30.1 | 36.8 | — | 94.9 | >97 |
| 55C | 100 | 99.8 | 99.5 | 99.9 | — | — | — | 31.8 | 48.1 | — | 90.5 | >97 |
| 55D | 99.9 | 99.9 | 99.9 | 99.9 | — | — | — | 24.9 | 47.6 | — | 87.9 | >97 |
| 55E | 99.9 | 99.9 | 99.9 | 99.9 | — | — | — | 22.4 | 48.0 | — | 92.8 | >97 |
| 56A | 99.8 | 99.8 | 99.7 | 99.8 | — | — | — | 13.5 | 86.5 | — | 93.3 | >96 |
| 56B | 99.9 | 99.9 | 99.9 | 99.9 | — | — | — | 11.3 | 93.7 | — | 94.4 | >96 |
| 56C | 99.9 | 99.8 | 99.9 | 99.9 | — | — | — | 6.6 | >97 | — | 95.1 | >95 |
| 56D | 99.8 | 99.8 | 99.8 | 99.8 | — | — | — | 4.6 | >97 | — | 95.3 | >95 |
| 56E | 99.9 | 99.9 | 99.9 | 99.9 | — | — | — | 1.7 | >97 | — | 95.8 | >95 |

Two Stage Rare Earth Hydroxide Production

A rare earth hydroxide precipitation test (Test 57) was conducted by contacting a measured quantity sodium hydroxide (97% of stoichiometry) to a measured quantity of purified rare earth sulphate solution (Table 48) at 55° C. in a suitable well agitated baffled vessel. The resulting mixture was mixed for a period of 30 minutes to allow it to stabilise, then a measured quantity of hydrogen peroxide (117% of stoichiometry) was added. The resulting mixture was mixed for a period of 30 minutes to allow it to stabilise, then vacuum filtered.

For the second stage, the unwashed cake from the first stage was repulped in DI water along with a measured quantity of sodium hydroxide (same mass as first stage). The mixture was agitated for 60 minutes at 55° C. then vacuum filtered. The resultant cake was washed.

The results are summarised in Tables 49 to 50.

TABLE 48

Feed solution composition (g/L or mg/L)

| Test | LRE g/L | MRE mg/L | HRE mg/L | TRE g/L | Mg mg/L | Al mg/L | P mg/L | S g/L | Ca mg/L | Fe mg/L | Th mg/L | U mg/L |
|---|---|---|---|---|---|---|---|---|---|---|---|---|
| 57 | 20.5 | 632 | 39 | 21.2 | 80 | <10 | <3 | 8.12 | 283 | <10 | 1.2 | 0.05 |

TABLE 49

Precipitate composition (% w/w or g/t)

| Stage | LRE % | MRE % | HRE g/t | TRE % | Mg % | Al g/t | P g/t | S % | Ca % | Fe g/t | Th g/t | U g/t |
|---|---|---|---|---|---|---|---|---|---|---|---|---|
| 1 | 64.6 | 1.57 | 748 | 66.4 | 0.29 | <53 | 175 | 2.38 | 0.33 | 350 | 69 | 2.09 |
| 2 | 66.9 | 1.69 | 802 | 68.8 | 0.34 | <53 | 87 | 0.30 | 0.46 | 280 | 73 | 2.36 |

TABLE 50

Precipitation (Stage 1) or dissolution (Stage 2) extent (%)

| Stage | LRE | MRE | HRE | TRE | Mg | Al | P | S | Ca | Fe | Th | U |
|---|---|---|---|---|---|---|---|---|---|---|---|---|
| 1 | 99.9 | 99.8 | 99.9 | 99.9 | 97.0 | — | — | 10.0 | 75.6 | — | 97.9 | >80 |
| 2 | 0 | 0 | 0 | 0 | 0 | 0 | 0 | 93 | 0 | 0 | 5 | 21 |

Selective Dissolution
The Influence of Rare Earth Concentration

A series of four two stage rare earth hydroxide dissolution tests (Tests 58 to 61) were conducted at 70° C. in a suitable well agitated baffled vessel with online pH measurement. Each test starts by simulating the second stage by dosing with a measured portion of 10% w/w hydrochloric acid to a measured portion of rare earth hydroxide cake (Table 51) that has been repulped in DI water (Test 58) or rare earth chloride solution (Tests 59 to 61), followed by a 30 minute period of stabilisation. Typically, this results in a slurry pH of around 1.2 to 2.2. Each test then concludes with the second stage by adding a measured quantity of rare earth hydroxide cake (typically 1.5 times that used to initiate the test), observing a 30 minute period of stabilisation, then dosing with a measured portion of 10% w/w hydrochloric acid, followed by a 30 minute period of stabilisation. Typically, this results in a slurry pH of around 3 to 4. The test is then concluded with vacuum filtration, followed by cake washing.

Tests 59 to 61 were initiated using rare earth chloride solution from test 58, with 2.8, 5.3, and 8.4 g of rare earth chloride solution added to tests 59 to 61 respectively per gram of rare earth hydroxide consumed by each test. The results are summarised in Tables 52 to 53.

TABLE 51

Feed Solid composition (% w/w or g/t)

| Test | LRE % | MRE % | HRE g/t | TRE % | Mg % | Al g/t | P g/t | S % | Ca % | Fe g/t | Th g/t | U g/t |
|---|---|---|---|---|---|---|---|---|---|---|---|---|
| 58 to 61 | 66.9 | 1.69 | 802 | 68.8 | 0.34 | <53 | 87 | 0.30 | 0.46 | 280 | 73 | 2.36 |

TABLE 52

Final dissolution solution composition (g/L or mg/L)

| Test | LRE g/L | MRE g/L | HRE mg/L | Ce mg/L | Mg mg/L | Al mg/L | P mg/L | S mg/L | Ca mg/L | Fe mg/L | Th mg/L | U mg/L |
|---|---|---|---|---|---|---|---|---|---|---|---|---|
| 58 | 51.2 | 2.16 | 110 | <1 | 482 | 30 | <3 | <1 | 1330 | <10 | 0.14 | <0.01 |
| 59 | 137 | 5.14 | 261 | <1 | 1220 | 60 | <3 | <1 | 3620 | <10 | 0.05 | <0.01 |
| 60 | 259 | 10.0 | 501 | <1 | 2180 | 110 | <3 | <1 | 6820 | <10 | 0.04 | <0.01 |
| 61 | 366 | 14.0 | 704 | <1 | 2970 | 150 | <3 | 40 | 9400 | <10 | 0.03 | <0.01 |

TABLE 53

Overall dissolution extent (%)

| Test | La | Ce | Pr | Nd | MRE | HRE | Y | Mg | Al | Ca | Th |
|---|---|---|---|---|---|---|---|---|---|---|---|
| 58 | 94.8 | <0.0021 | 82.0 | 78.3 | 69.1 | 60.6 | 67.6 | 94.2 | — | 98.7 | 0.9 |
| 59 | 92.5 | <0.0015 | 73.1 | 67.1 | 49.0 | 39.9 | 39.0 | 90.6 | — | 97.3 | 0 |
| 60 | 94.8 | <0.0013 | 79.2 | 74.6 | 58.6 | 46.6 | 45.3 | 89.9 | — | 98.5 | 0 |
| 61 | 95.2 | <0.0012 | 80.4 | 75.1 | 57.4 | 43.4 | 43.7 | 87.6 | — | 98.5 | 0 |

Two Stage Selective Dissolution

A two stage rare earth hydroxide dissolution test (Test 62) was conducted at 70° C. in a suitable well agitated baffled vessel with online pH measurement. The test was initiated by repulping 60% of the rare earth hydroxide cake (Table 54) in de-ionised water followed by the controlled dosing of 10% w/w hydrochloric acid to online pH targets of pH 2 (sample 1), then pH 1 (sample 2). At pH 1, all of the rare earth hydroxide precipitate had been dissolved. The remaining 40% of the rare earth hydroxide cake was then added and the mixture allowed to stabilise under agitation for 30 minutes (sample 3). Controlled acid addition was then resumed to pH 3 (sample 4), pH 2 (sample 5), and pH 1 (sample 6). This time the rare earth hydroxide cake did not completely dissolve. The final slurry was allowed to agitate for a further 50 minutes prior to collection of the final sample (sample 7). Following each period of acid dosing and achievement of an on-line pH target, the resultant mixture was allowed to mix for at least 15 minutes prior to sample collection. Subsamples were vacuum filtered, followed by cake washing.

The results are summarised in Tables 55 to 57. From the results, despite completely dissolving all the cerium in rare earth hydroxide by sample 2, the addition of additional rare earth hydroxide drove a reprecipitation such that by sample 4 (targeting pH 3, achieving pH 3.2 after stabilisation) the concentration of cerium in solution was below detection limit. This suggests that the cerium dissolved as cerium IV in this test.

TABLE 54

Feed Solid composition (% w/w or g/t)

| Test | LRE % | MRE % | HRE g/t | Y g/t | Mg % | Al g/t | P g/t | S % | Ca % | Fe g/t | Th g/t | U g/t |
|---|---|---|---|---|---|---|---|---|---|---|---|---|
| 62 | 68.3 | 1.81 | 2163 | 5290 | 0.18 | 159 | 148 | 0.32 | 0.49 | 420 | 3.5 | 1.9 |

TABLE 55

Subsample dissolution solution composition (g/L or mg/L)

| Sample | La g/L | Ce mg/L | Pr g/L | Nd g/L | MRE g/L | HRE mg/L | Y mg/L | Mg mg/L | Al mg/L | S g/L | Ca mg/L |
|---|---|---|---|---|---|---|---|---|---|---|---|
| 1 | 13.8 | 142 | 2.58 | 8.84 | 1.21 | 149 | 364 | 56 | <20 | 2 | 978 |
| 2 | 17.4 | 32400 | 3.51 | 12.1 | 1.80 | 228 | 500 | 206 | <20 | 242 | 1206 |
| 3 | 18.2 | 20 | 1.83 | 5.51 | 0.28 | 15 | 32 | 78 | <20 | <2 | 1494 |
| 4 | 22.6 | <2 | 4.16 | 14.3 | 1.86 | 201 | 552 | 90 | <20 | 10 | 1592 |
| 5 | 20.8 | 20 | 4.20 | 14.5 | 1.96 | 224 | 538 | 80 | <20 | 4 | 1426 |
| 6 | 26.2 | 2900 | 5.51 | 19.1 | 2.60 | 303 | 760 | 122 | 20 | 24 | 1784 |
| 7 | 31.2 | 4940 | 6.44 | 22.2 | 3.17 | 372 | 900 | 130 | 20 | 20 | 2140 |

TABLE 56

Subsample solid composition (% w/w or g/t)

| Sample | La % | Ce % | Pr % | Nd % | MRE % | HRE g/t | Y g/t | Mg % | Al g/t | S % | Ca g/t | Fe g/t |
|---|---|---|---|---|---|---|---|---|---|---|---|---|
| 1 | 1.12 | 63.1 | 0.89 | 3.29 | 0.55 | 894 | 1530 | 0.18 | 265 | 0.61 | 286 | 699 |
| 2 | — | — | — | — | — | — | — | — | — | — | — | — |
| 3 | 3.14 | 47.7 | 3.05 | 11.5 | 2.23 | 3021 | 7090 | 0.15 | 265 | 0.46 | 572 | 560 |
| 4 | 0.92 | 63.2 | 1.03 | 3.61 | 0.69 | 1194 | 1560 | 0.11 | 423 | 0.60 | 214 | 699 |
| 5 | 0.64 | 65.0 | 0.68 | 2.43 | 0.46 | 735 | 1020 | 0.10 | 212 | 0.61 | 214 | 629 |
| 6 | 0.54 | 66.0 | 0.54 | 1.85 | 0.35 | 552 | 752 | 0.10 | 1006 | 0.63 | 214 | 1189 |
| 7 | 0.61 | 68.2 | 0.56 | 2.01 | 0.36 | 567 | 842 | 0.10 | 265 | 0.64 | 214 | 909 |

TABLE 57

Overall dissolution extent (%)

| Sample | La | Ce | Pr | Nd | MRE | HRE | Y | Mg | Al | Ca | Th |
|---|---|---|---|---|---|---|---|---|---|---|---|
| 1 | 97.2 | 0.6 | 88.9 | 88.2 | 86.0 | 82.3 | 86.9 | 59.0 | — | 99.0 | 16.7 |
| 2 | 100 | 100 | 100 | 100 | 100 | 100 | 100 | 100 | 100 | 100 | 100 |
| 3 | 88.0 | 0.053 | 43.1 | 37.6 | 13.8 | 5.8 | 5.4 | 39.5 | — | 97.1 | 14.3 |
| 4 | 97.6 | <0.005 | 87.0 | 86.7 | 81.6 | 73.6 | 85.4 | 56.5 | — | 99.2 | 11.3 |
| 5 | 98.4 | 0.057 | 92.0 | 91.7 | 88.9 | 85.0 | 90.7 | 59.2 | — | 99.2 | 11.9 |

TABLE 57-continued

| | Overall dissolution extent (%) | | | | | | | | | | |
|---|---|---|---|---|---|---|---|---|---|---|---|
| Sample | La | Ce | Pr | Nd | MRE | HRE | Y | Mg | Al | Ca | Th |
| 6 | 99.4 | 13.9 | 97.4 | 97.4 | 96.5 | 95.3 | 97.4 | 81.4 | 42.3 | 99.7 | 41.5 |
| 7 | 99.4 | 19.6 | 97.5 | 97.4 | 96.7 | 95.7 | 97.3 | 81.0 | 71.7 | 99.7 | 39.7 |

A person skilled in the art will understand that there may be variations and modifications other than those specifically described. It is to be understood that the invention includes all such variations and modifications. The invention also includes all steps, features, compositions and compounds referred to, or indicated in this specification, individually or collectively, and any and all combinations of any two or more of the steps or features.

The claims defining the invention are as follows:

1. A method of processing a purified rare earth sulfate solution, the method including:
   a) contacting the purified rare earth sulphate solution with sodium hydroxide to precipitate rare earths as rare earth hydroxide, including the addition of an oxidant to oxidise cerium contained in the rare earth hydroxide precipitate; and
   b) selectively leaching the rare earth hydroxide precipitate with hydrochloric acid to form a rare earth chloride solution that contains negligible cerium and a residue that consists primarily of cerium (IV) hydroxide.

2. The processing method of claim 1, wherein the precipitation occurs in a two-stage counter-current process, including a precipitation stage and refining stage, wherein the purified rare earth sulphate solution feeds into the precipitation stage with spent solution from the refining stage, to precipitate rare earth hydroxide containing sulphate.

3. The processing method of claim 2, wherein the sulphate containing rare earth hydroxide is subsequently converted to clean rare earth hydroxide in the refining stage with the addition of fresh sodium hydroxide.

4. The processing method of claim 2, wherein the oxidant is hydrogen peroxide and/or sodium hypochlorite, which is added to the precipitation and/or refining stages following sodium hydroxide addition.

5. The processing method of claim 2, wherein both the precipitation and the refining stage operate at a temperature of 40 to 80° C., and for a time of about 30 to 60 minutes, with the stoichiometry of sodium hydroxide addition being in the range of 100 to 110%, and with 100 to 130% of stoichiometry dosing of oxidant.

6. The processing method of claim 1, wherein the selective leaching of rare earth hydroxide precipitate is conducted in two stages, each stage having multiple tanks and each stage using hydrochloric acid diluted to 5 to 15% w/w with leach solution from the first leach stage.

7. The processing method of claim 6, wherein leach solution from the second leach stage is used to re-pulp, leach rare earth hydroxide precipitate, and precipitate cerium (IV) dissolved in the second leach stage, prior to the first leach stage.

8. The processing method of claim 6, wherein the selective leaching occurs at a temperature of 60 to 80° C., the first leach stage is operated to maximise rare earth dissolution while minimising cerium (IV) dissolution, which is achieved with an endpoint pH of about pH 3 to 4, and the second leach stage is operated to minimise the concentration of non-cerium rare earth elements in the residue.

9. The processing method of claim 1, wherein barium chloride is added to the rare earth chloride solution, with sulphuric acid when sulphate levels are low, to remove radium via co-precipitation with barium sulphate to form a purified rare earth chloride solution.

10. The method of claim 8, wherein the purified rare earth chloride solution is concentrated by evaporation.

* * * * *